(12) United States Patent
Leizerson et al.

(10) Patent No.: US 11,187,648 B2
(45) Date of Patent: Nov. 30, 2021

(54) TWO-STAGE PHOTO-ACOUSTIC EXCITATION SENSING SYSTEMS AND METHODS

(71) Applicant: Elbit Systems Land and C4I Ltd., Netanya (IL)

(72) Inventors: Ilya Leizerson, Netanya (IL); Adi Yosef Mordechai Sussholz, Netanya (IL); David Stavitsky, Netanya (IL)

(73) Assignee: Elbit Systems Land C4I Ltd., Netanya (IL)

( * ) Notice: Subject to any disclaimer, the term of this patent is extended or adjusted under 35 U.S.C. 154(b) by 0 days.

(21) Appl. No.: 17/137,393

(22) Filed: Dec. 30, 2020

(65) Prior Publication Data

US 2021/0116358 A1    Apr. 22, 2021

Related U.S. Application Data

(63) Continuation of application No. PCT/IL2019/050890, filed on Aug. 5, 2019.

(51) Int. Cl.
*G01N 21/17* (2006.01)
*G06T 7/521* (2017.01)
(Continued)

(52) U.S. Cl.
CPC ......... *G01N 21/1702* (2013.01); *G01N 21/55* (2013.01); *G01N 29/2418* (2013.01);
(Continued)

(58) Field of Classification Search
CPC .............. G01N 21/1702; G01N 21/55; G01N 29/2418; G01N 2021/1706; G06T 7/521;
(Continued)

(56) References Cited

U.S. PATENT DOCUMENTS

| 4,641,527 A | 2/1987 | Hiroi et al. |
| 4,870,865 A | 10/1989 | Hane et al. |

(Continued)

FOREIGN PATENT DOCUMENTS

| JP | 2004101189 | 4/2004 |
| WO | WO 97/27801 | 8/1997 |

OTHER PUBLICATIONS

International Search Report for PCT Application No. PCT/IL2019/050890, dated Nov. 20, 2019.

(Continued)

*Primary Examiner* — Brenda C Bernardi
(74) *Attorney, Agent, or Firm* — Pearl Cohen Zedek Latzer Baratz LLP

(57) ABSTRACT

A system and a method for sensing an object using two-stage photo-acoustic excitation are provided herein. The method may include: scanning the object at a first resolution by alternately and repeatedly photo-acoustically exciting and sensing each of multiple first regions on the object to yield multiple first outputs; determining, based on the multiple first outputs, at least one first region of the multiple first regions that includes at least one zone and a specific depth of the at least one zone below a surface of the object; scanning the first region that includes the at least one zone at a second resolution by alternately and repeatedly photo-acoustically exciting and sensing each of multiple second regions in the at least one first region thereof to yield multiple second outputs; and determining, based on at least one of the multiple second outputs, specified parameters of the at least one zone.

20 Claims, 26 Drawing Sheets

(51) Int. Cl.
  *G06T 7/13* (2017.01)
  *G06T 7/246* (2017.01)
  *G01N 21/55* (2014.01)
  *G01N 29/24* (2006.01)
  *G06T 7/00* (2017.01)

(52) U.S. Cl.
  CPC ............. *G06T 7/001* (2013.01); *G06T 7/13* (2017.01); *G06T 7/248* (2017.01); *G06T 7/521* (2017.01); *G01N 2021/1706* (2013.01); *G06T 2200/04* (2013.01); *G06T 2207/10016* (2013.01); *G06T 2207/10048* (2013.01); *G06T 2207/10152* (2013.01)

(58) Field of Classification Search
  CPC ........... G06T 7/13; G06T 7/248; G06T 7/001; G06T 2200/04; G06T 2207/10016; G06T 2207/10048; G06T 2207/10152
  See application file for complete search history.

(56) References Cited

U.S. PATENT DOCUMENTS

| | | | |
|---|---|---|---|
| 5,212,667 | A | 5/1993 | Tomlinson, Jr. et al. |
| 5,301,003 | A | 4/1994 | Ikeda |
| 5,608,166 | A | 3/1997 | Monchalin et al. |
| 6,008,887 | A | 12/1999 | Klein et al. |
| 7,088,455 | B1 | 8/2006 | Kirkpatrick et al. |
| 9,506,742 | B2 | 11/2016 | Horstmann et al. |
| 9,964,747 | B2* | 5/2018 | Ntziachristos ....... A61B 5/0084 |
| 2008/0291465 | A1 | 11/2008 | Lorraine et al. |
| 2010/0226543 | A1 | 9/2010 | Zalevsky |
| 2012/0200845 | A1 | 8/2012 | Rousseau et al. |
| 2014/0116146 | A1 | 5/2014 | Bossi et al. |
| 2014/0247456 | A1 | 9/2014 | Horstmann et al. |
| 2015/0265157 | A1 | 9/2015 | Psaltis et al. |
| 2017/0258332 | A1 | 9/2017 | Wynn et al. |
| 2017/0323132 | A1 | 11/2017 | Lu et al. |
| 2020/0371018 | A1* | 11/2020 | Leizerson .......... G01N 21/1702 |

OTHER PUBLICATIONS

Buj, Christian, et al. "Noncontact holographic detection for photoacoustic tomography"; Journal of biomedical optics, vol. 22(10), Oct. 2017; pp. 106007.1-106007.14.

Van Oepen et al. "Characterization of an Electronic Speckle Pattern Detection System"; Student Conference Medical Engineering Science 2013: Proceedings, Lübeck, pp. 51-54.

Jens Horstmann et al. "Non-contact Photoacoustic Tomography using holographic full field detection"; European Conference on Biomedical Optics (2013).

C. Buj, J. Horstmann, M. Münter, and R. Brinkmann; "Speckle-based of-axis holographic detection for non-contact photoacoustic tomography"; Biomedical Engineering 2015; 1:356-360.

Extended European Search Report for EP Patent Application No. 18844106.7, dated Apr. 19, 2021.

* cited by examiner

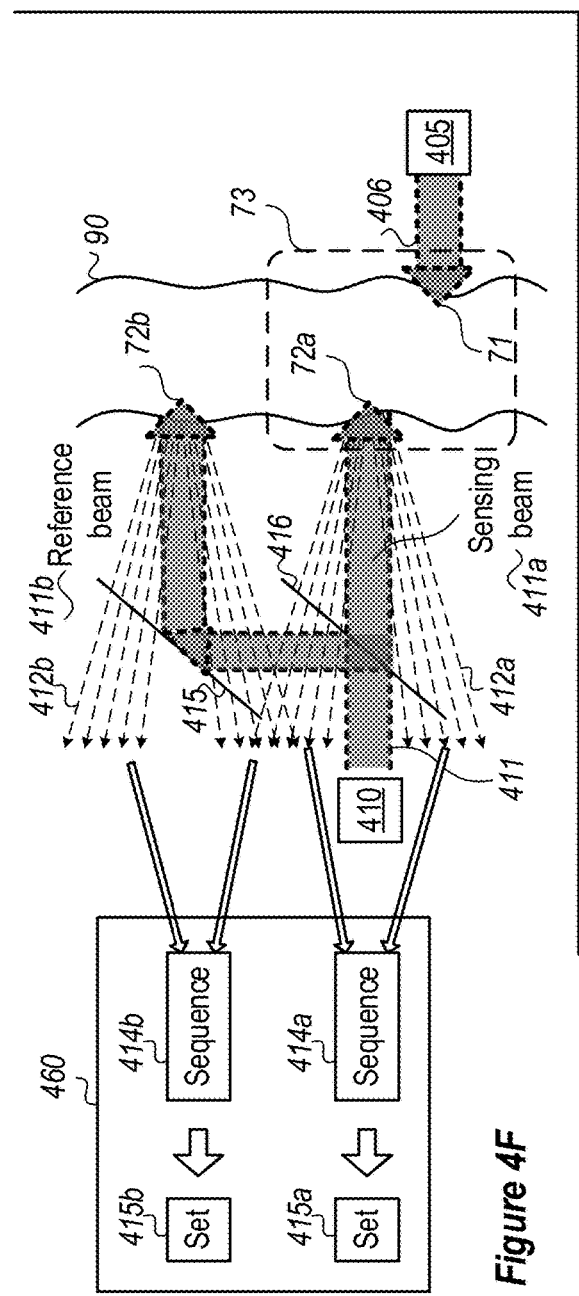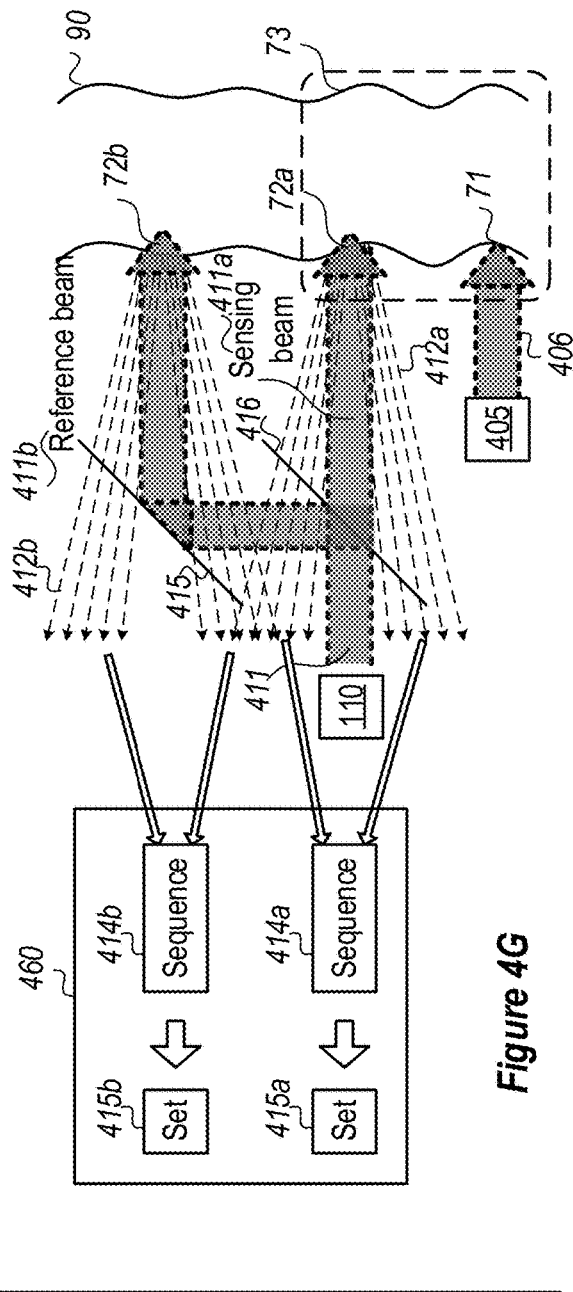

414

Speckle pattern image obtained form reflected reference beam 412b

Speckle pattern image obtained form reflected sensing beam 412a

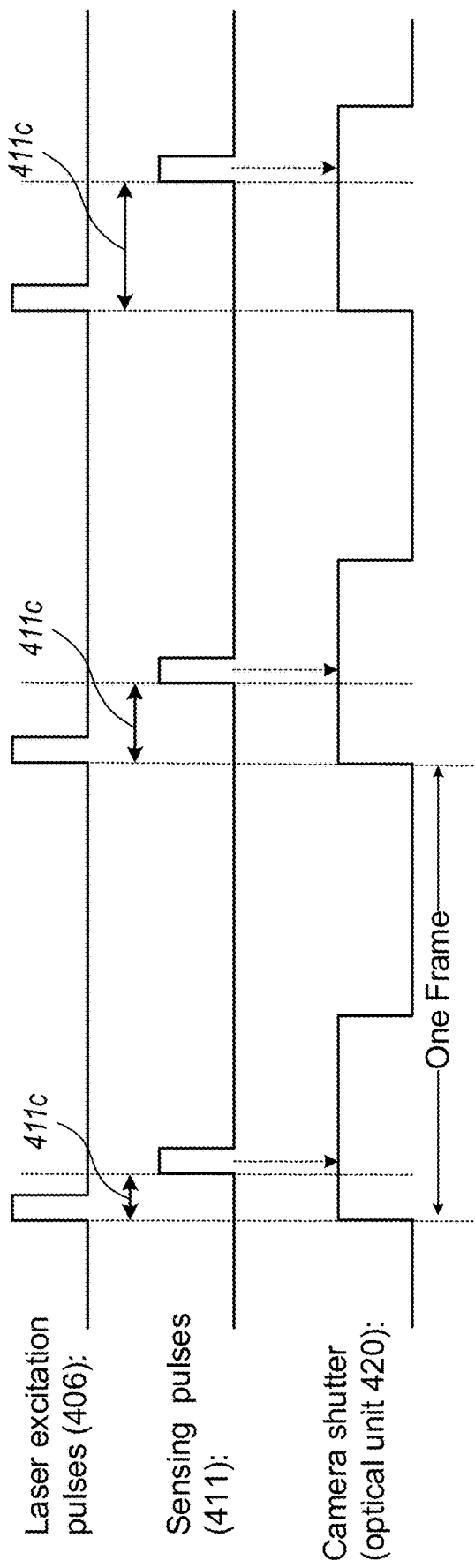

5000

```
┌─────────────────────────────────────────────────────────────┐
│ Scanning the object at a first predetermined resolution by  │
│ alternately photo-acoustically exciting and sensing each of │
│ multiple first regions on the object with at least one first│ ~5100
│ excitation laser beam and at least one first sensing laser  │
│ beam, respectively                                          │
└─────────────────────────────────────────────────────────────┘
                              │
┌─────────────────────────────────────────────────────────────┐
│ Gathering light reflected from the multiple first regions   │ ~5200
│ and generating, based on the gathered light, multiple first │
│ outputs                                                     │
└─────────────────────────────────────────────────────────────┘
                              │
┌─────────────────────────────────────────────────────────────┐
│ Determining, based on at least one of the multiple first    │
│ outputs, corresponding at least one first region of the     │
│ multiple regions that includes at least one zone and further│ ~5300
│ determining the specific depth of the at least one zone     │
│ thereof below a surface of the object                       │
└─────────────────────────────────────────────────────────────┘
                              │
┌─────────────────────────────────────────────────────────────┐
│ Illuminating at least a portion of a first region of the    │
│ multiple first regions that is being scanned with at least  │
│ one modulated excitation laser beam having a modulated      │
│ amplitude, a frequency that varies between a first          │ ~5310
│ predetermined frequency value and a second predetermined    │
│ frequency value as function of time, and a constant         │
│ predetermined wavelength                                    │
└─────────────────────────────────────────────────────────────┘
                              │
┌─────────────────────────────────────────────────────────────┐
│ Comparing a signal corresponding to the at least one        │
│ modulated excitation laser beam and a first output of the   │
│ multiple first outputs that corresponds to the first region │ ~5312
│ that is being scanned and determining, based on the         │
│ comparison thereof, a presence of the at least one zone in  │
│ the first region thereof                                    │
└─────────────────────────────────────────────────────────────┘
                              │
┌─────────────────────────────────────────────────────────────┐
│ Splitting the at least one first sensing laser beam into a  │ ~5320
│ first sensing beam and a first reference beam               │
└─────────────────────────────────────────────────────────────┘
                              │
                              ▼
```

- Directing the first sensing beam to illuminate a predetermined sensing location within a first region of the multiple first regions that is being scanned and directing the first reference beam to a predetermined reference location on the object that is not affected by the photo-acoustic excitation of the object in the first region thereof ~5322

- Generating, for a first region of the multiple first regions that is being scanned, a first sensing output and a first reference output, based on the light reflected or scattered from the predetermined sensing location and the predetermined reference location, respectively ~5324

- Determining, based on at least one of the first sensing output, the first reference output and/or a comparison between the first sensing output and the first reference output, a presence of the at least one zone in the first region thereof ~5326

- Scanning the at least one first region that includes the at least one zone at a second predetermined resolution by alternately photo-acoustically exciting and sensing each of multiple second regions in the at least one first region thereof with at least one second excitation laser beam and at least one second sensing laser beam, respectively ~5400

- Gathering light reflected from the multiple second regions and determining, based on the gathered light, multiple second outputs ~5500

- Determining, based on at least one of the multiple second outputs, specified parameters of the at least one zone ~5600

```
                    │
┌───────────────────┴────────────────────┐
│ Determining a time delay between the at least one second │
│ sensing laser beam and the at least one second excitation laser │
│ beam based on the specific depth of the at least one zone below │ ~5610
│ the surface of the object and based on acoustic parameters of │
│                the object              │
└───────────────────┬────────────────────┘
```

- Determining a time delay between the at least one second sensing laser beam and the at least one second excitation laser beam based on the specific depth of the at least one zone below the surface of the object and based on acoustic parameters of the object ~5610

- Generating, for a second region of the multiple second regions that is being scanned, a sequence comprising at least two temporally-sequential de-focused speckle pattern images of the second region thereof, and determining, for the second region that is being scanned, based on the sequence thereof, a set of speckle pattern images translations ~5620

- Determining, for the second region that is being scanned, an angular distortion of the corresponding second region, based on the set of translations determined for the corresponding second region ~5622

- Determining, based on the angular distortion of the corresponding second region, an intensity pattern of the photo-acoustic excitation propagating through the second region thereof ~5624

- Determining, based on the intensity patterns generated for at least some of the multiple second regions, the specified parameters of the at least one zone ~5626

- Illuminating multiple predetermined locations within the second region of the multiple second regions that is being scanned, with multiple narrow beams ~5630

Generating corresponding multiple sequences of temporally-sequential speckle pattern images of the second region thereof, wherein each of the multiple sequences corresponds to one of the multiple predetermined locations thereof ~5632

Determining, for the second region that is being scanned, multiple sets of translations, based on the corresponding multiple sequences thereof, wherein each of the multiple sets corresponds to one of the multiple predetermined locations thereof ~5634

Illuminating multiple predetermined locations within the second region that is being scanned with a single wide beam ~5640

Generating a sequence of temporally-sequential speckle pattern images comprising data regarding the multiple predetermined locations, wherein each speckle pattern image in the sequence thereof comprises multiple image parts, wherein each of the multiple image parts corresponds to one of the multiple predetermined locations ~5642

Determining multiple sets of translations based on the image parts thereof, wherein each of the multiple sets corresponds to one of the predetermined locations thereof ~5644 splitting the at least one second sensing laser beam into a second sensing beam and a second reference beam ~5650

```
┌─────────────────────────────────────────────────────────────┐
│ Illuminating a predetermined sensing location within the second │
│ region that is being scanned and a predetermined reference  │
│ location that is not affected by the photo-acoustic excitation of │ ~5652
│ the object in the second region thereof, with the second sensing │
│ beam and the second reference beam respectively             │
└─────────────────────────────────────────────────────────────┘
                              │
┌─────────────────────────────────────────────────────────────┐
│ Gathering corresponding scattered or reflected second sensing │
│ beam and second reference beam and generating               │
│ corresponding sensing and reference sequences of temporally- │ ~5653
│ sequential speckle patter images                            │
└─────────────────────────────────────────────────────────────┘
                              │
┌─────────────────────────────────────────────────────────────┐
│ Determining a sensing and a reference sets of translations  │ ~5656
│ based on the sensing and reference sequences, respectively  │
└─────────────────────────────────────────────────────────────┘
                              │
┌─────────────────────────────────────────────────────────────┐
│ Comparing the sensing set of translations and the reference set │
│ of translations, and further determining, based on the      │
│ comparison thereof, a whole-body movement of the second     │ ~5658
│ region that is being scanned to distinguish the whole-body  │
│ movement from the photo-acoustic excitation of the second   │
│ region thereof                                              │
└─────────────────────────────────────────────────────────────┘
                              │
┌─────────────────────────────────────────────────────────────┐
│ Determining a lateral shift between the second excitation laser │
│ beam and the second sensing laser beam to provide maximal   │ ~5660
│ amplitude of signals determined based on the corresponding  │
│ sets of translations                                        │
└─────────────────────────────────────────────────────────────┘
                              │
┌─────────────────────────────────────────────────────────────┐
│ Determining a pulse duration of the second excitation laser │
│ beam and a pulse duration of the second sensing laser beam  │ ~5662
│ based on at least one of: a desired spatial resolution, physical │
│ properties of the object                                    │
└─────────────────────────────────────────────────────────────┘
                              ↓
```

```
Increasing a delay between a pulse of the second excitation
laser beam and a pulse of the second sensing laser beam to
during an inspection procedure of the object to enable acquiring     ~5664
of speckle pattern images at different time points during an
exposure time of the detector to thereby increase an effective
sampling rate of the detector
```

```
Determining a frequency of the second sensing laser beam
pulses based on a frequency of the excitation beam pulses, to
yield second sensing laser beam pulses that are affected by
corresponding excitation beam pulses and second sensing laser       ~5666
beam pulses that are not affected by second excitation beam
pulses, and comparing speckle patterns from the affected and
non-affected second sensing laser beam pulses
```

```
Operating the second excitation laser beam and the second
sensing laser beam on a same side of the object or on the           ~5668
opposite sides of the object
```

```
Measuring an amount of energy originated from the second            ~5670
excitation laser beam and absorbed by the object
```

```
Determining energy dissipation profiles in the object undergoing
the photo-acoustic excitation and determining, based on the         ~5672
energy dissipation profiles, the specified parameters of the at
least one zone
```

```
Providing 3D images of the object                                   ~5674
```

*Figure 5 (cont. 5)*

TWO-STAGE PHOTO-ACOUSTIC EXCITATION SENSING SYSTEMS AND METHODS

CROSS-REFERENCE TO RELATED APPLICATIONS

This application is a Continuation of WIPO Patent Application No. PCT/IL2019/050890 filed on Aug. 5, 2019 which claims priority from Israeli Patent Application No. 261039 filed on Aug. 7, 2018, both of which are incorporated herein by reference in their entirety.

FIELD OF THE INVENTION

The present invention relates to the field of part inspection system and methods, and more particularly, to photo-acoustic excitation inspection methodologies.

BACKGROUND OF THE INVENTION

A photo-acoustic effect is the formation of sound waves following light absorption in a material sample or a part under test. The photo-acoustic effect is achieved by varying the light intensity, either periodically (modulated light) or as a single flash (pulsed light) impinging on a surface.

In methods known in the art, the photo-acoustic effect may be quantified by measuring the formed sound (pressure changes) with appropriate detectors, such as microphones or piezoelectric sensors. The temporal variation of the electric output (current or voltage) from these detectors is related to the photo-acoustic signal. These measurements are useful to determine certain properties of the studied sample. For example, in photo-acoustic spectroscopy, the photo-acoustic signal is used to obtain the actual absorption of light illuminating the object with respect to the specific illumination wavelength.

Photo-acoustic excitation is also a known method of inspecting parts, as it is a non-destructive method which does not require direct contact with the part being inspected.

SUMMARY OF THE INVENTION

One aspect of the present invention provides a system for inspecting an object, the system may include: at least one inspection unit including: an excitation laser source to illuminate at least a portion of the object with at least one excitation laser beam; a sensing laser source to illuminate at least a portion of the object with at least one sensing laser beam; wherein the at least one inspection unit is configured to scan the object at a first predetermined resolution by alternately photo-acoustically exciting and sensing each of multiple first regions on the object with the at least one excitation laser beam and the at least one sensing laser beam, respectively, and further to scan at least one of the multiple first regions at a second predetermined resolution by alternately photo-acoustically exciting and sensing each of multiple second regions in the at least one first region thereof with the at least one excitation laser beam and the at least one sensing laser beam, respectively; and an optical unit in association with a detector, wherein the optical unit is configured to collect light generated by the sensing laser source and reflected from the multiple first regions and further to collect light reflected from the multiple second regions onto the detector, and wherein the detector is configured to generate, based on the collected light, multiple first detector outputs and multiple second detector outputs, respectively; and an analysis unit coupled to the at least one inspection unit, the analysis unit configured to: determine, based on at least one of the multiple first detector outputs, at least one first region of the multiple first regions having at least one zone, and further to determine a specific depth of the at least one zone thereof, and determine, based on at least one of the multiple second outputs, specified parameters of the at least one zone.

Another aspect of the present invention provides a method of inspecting an object, the method may include: scanning the object at a first predetermined resolution by alternately photo-acoustically exciting and sensing each of multiple first regions on the object with at least one first excitation laser beam and at least one first sensing laser beam, respectively; collecting light generated by the at least one first sensing laser beam and reflected from the multiple first regions and generating, based on the collected light, multiple first outputs; determining, based on at least one of the multiple first outputs, at least one first region of the multiple regions that includes at least one zone and further determining a specific depth of the at least one zone thereof below a surface of the object; scanning the at least one first region that includes the at least one zone at a second predetermined resolution by alternately photo-acoustically exciting and sensing each of multiple second regions in the at least one first region thereof with at least one second excitation laser beam and at least one second sensing laser beam, respectively; collecting light generated by the at least one second sensing laser beam and reflected from the multiple second regions and determining, based on the collected light, multiple second outputs; and determining, based on at least one of the multiple second outputs, specified parameters of the at least one zone.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings:

FIGS. 4F and 4G are schematic illustrations of an inspection unit of a system for inspecting an object and including a beam splitter to split sensing laser beam into a first sensing beam and a first reference beam, according to some embodiments of the invention;

FIGS. 4O and 4P are schematic time diagrams for laser excitation beam pulses, sensing laser beam pulses and exposures of detector of an inspection unit for a system for inspecting an object, according to some embodiments of the invention;

FIG. 5 is a flowchart of a method of inspecting an object, according to some embodiments of the invention.

Figure 1A:
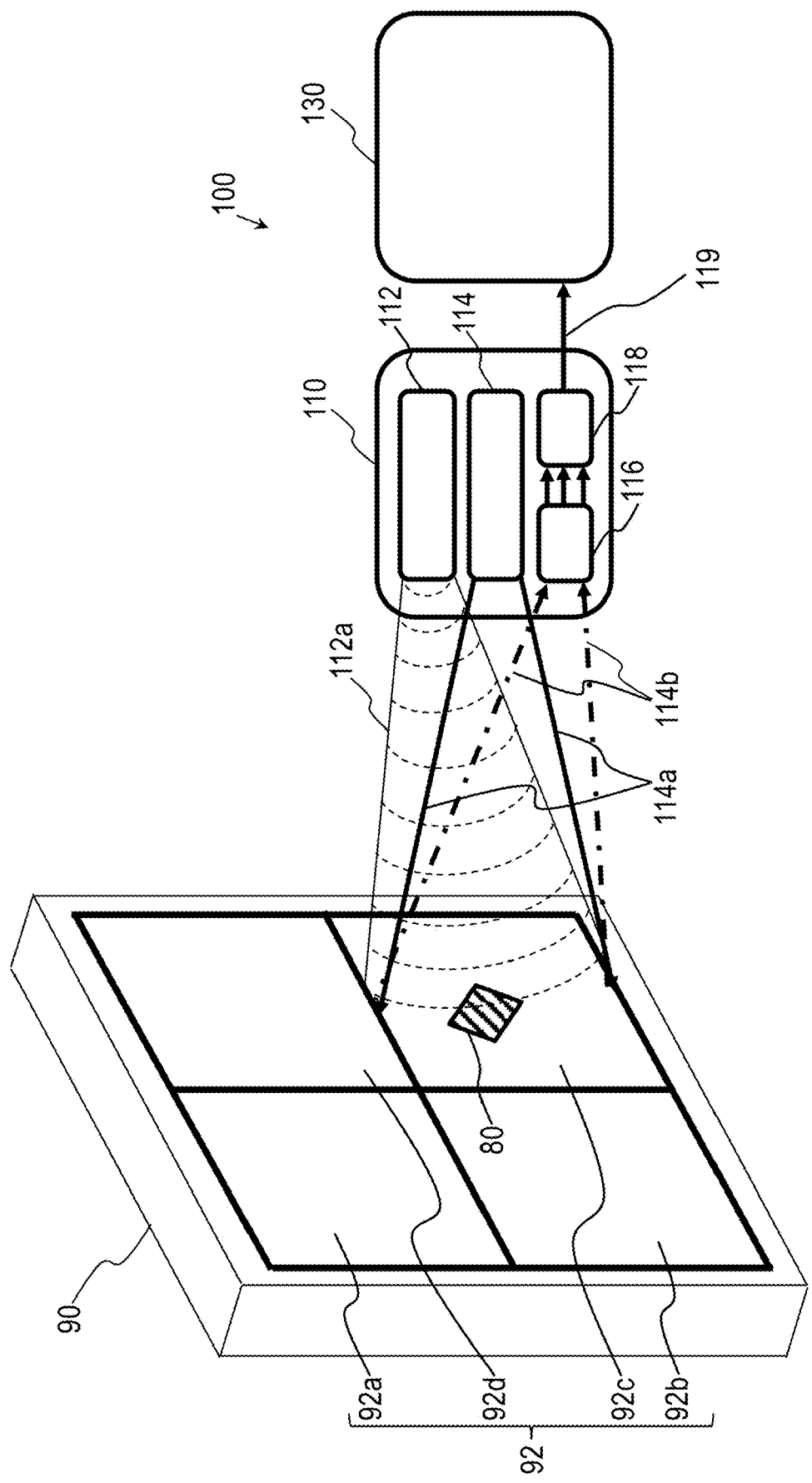
FIGS. 1A, 1B and 1C are schematic illustrations various configurations of a system for inspecting an object, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Generally, systems and methods for inspecting an object are disclosed. The system may include an inspection unit (or at least one inspection unit) and an analysis unit coupled to the inspection unit. The inspection unit may be configured to scan the object at a first predetermined resolution by alternately and repeatedly photo-acoustically exciting and sensing each of predetermined multiple first regions on the object with a first excitation laser beam and a first sensing laser beam, respectively. It thus yields multiple first scanning results.

The analysis unit may be configured to determine, based on one or more of the multiple first scanning results, a first region of the predetermined multiple first regions that includes at least one zone (e.g., defect, crack, inhomogeneity, inclusion, etc.) and to determine a specified depth of the at least one zone below a surface of the object.

The inspection unit may be configured to scan the at least one first region that includes the at least one zone, at a second predetermined resolution by alternately and repeatedly photo-acoustically exciting and sensing each of predetermined multiple second regions in the at least one first region (e.g., that includes the at least one zone) with a second excitation laser beam and a second sensing laser beam, respectively. It thus yields multiple second scanning results.

In some embodiments, a time delay between the second excitation laser beam and the second sensing laser beam may be determined based on the specific depth of the at least one zone below the surface of the object (determined during the scanning of the object at the first predetermined resolution) and based on the acoustic parameters of the object. In some embodiments, the time delay thereof may further depend on a thickness of the object.

The analysis unit may further determine, based on at least some of the multiple second scanning results, specified parameters of the at least one zone (e.g., exact shape and/or dimensions of the at least one zone).

In various embodiments, the system may utilize interferometric methods and/or speckle pattern interferometric methods to scan the object at the first predetermined resolution and/or at the second predetermined resolution.

Figure 1B:
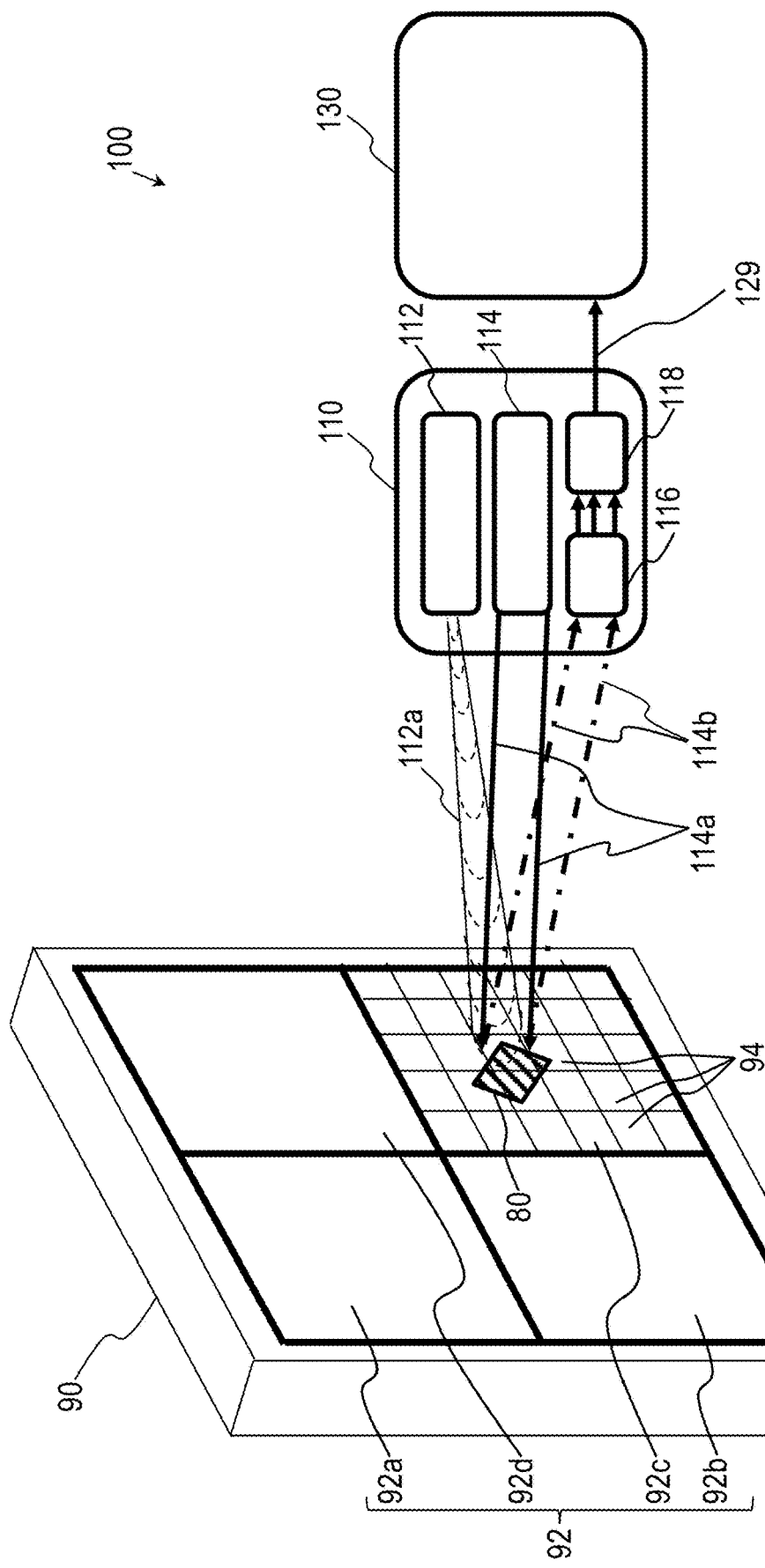
Figure 1C:
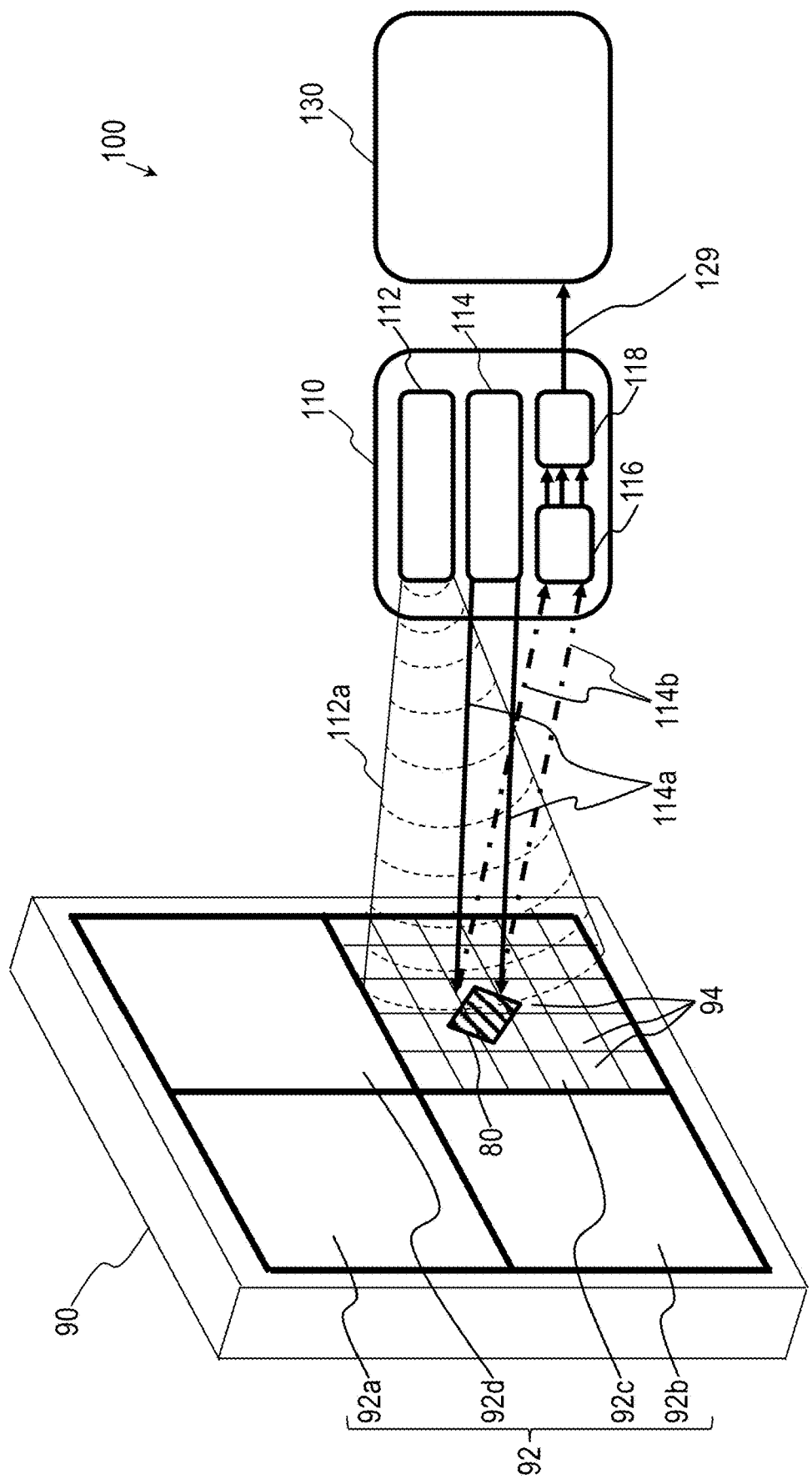

Reference is now made to FIGS. 1A-1C, which are schematic illustrations various configurations of a system 100 for inspecting an object 90, according to some embodiments of the invention.

System 100 may include an inspection unit 110. Inspection unit 110 may scan object 90 (or at least a portion of object 90) at a first predetermined resolution (e.g., as described below with respect to FIG. 1A) and/or to scan object 90 (or at least a portion of object 90) at a second predetermined resolution (e.g., as described below with respect to FIGS. 1B and 1C).

Inspection unit 110 may include an excitation laser source 112. Excitation laser source 112 may illuminate object 90 (or at least a portion of object 90) with at least one excitation laser beam 112a to thereby generate photo-acoustic excitation of object 90 (or of at least a portion of object 90).

Inspection unit 110 may include a sensing laser source 114. Sensing laser source 114 may illuminate object 90 (or at least a portion of object 90) with at least one sensing laser beam 114a to thereby sense object 90 (or at least a portion of object 90).

Inspection unit 110 may scan object 90 (or at least a portion of object 90) at the first predetermined resolution by alternately and repeatedly photo-acoustically exciting and sensing each of predetermined multiple first regions 92 on object 90 with at least one excitation laser beam 112a and at least one sensing laser beam 114a, respectively. For example, multiple first regions 92 may include a first region 92a, a second first region 92b, a third first region 92c and a fourth first region 92d (e.g., as shown in FIGS. 1A, 1B and 1C).

In some embodiments, inspection unit 110 may subsequently scan multiple first regions 92. FIG. 1A shows, for example, scanning of third first region 92c by at least one inspection unit 110.

In some embodiments, excitation laser beam 112a (generated by excitation laser source 112) and sensing beam 114a (generated sensing laser source 114) may illuminate substantially the same location to scan a specific first region of multiple first regions 92. For example, excitation laser source 112 may photo-acoustically excite the first region of multiple first regions 92 being scanned with excitation laser beam 112a and further to sense the first region thereof with sensing beam 114a (e.g., as shown in FIG. 1A). Alternatively or complementarily, the location being illuminated by excitation beam 112a and the location being illuminated by sensing beam 114a may be at a predetermined offset with respect to each other (not shown).

Inspection unit 110 may include an optical unit 116. At least one inspection unit 110 may include a detector 118. Detector 118 may be in association with optical unit 116.

Optical unit 116 may collect light 114b reflected from multiple first regions 92 being scanned (e.g., subsequently scanned) to detector 118. For example, FIG. 1A shows light 114b reflected from third first region 92c being detected by detector 118.

Detector 118 may generate, based on light 114b reflected from multiple first regions 92, corresponding multiple first detector outputs 119. In some embodiments, each of multiple first detector outputs 119 is generated based on light 114b reflected from one of multiple first regions 92. In these embodiments, each of multiple first detector outputs 119 corresponds to one of multiple first regions 92.

First detector outputs 119 may vary based on specific configurations of system 100 and/or of inspection unit 110. In various embodiments, first detector outputs 119 may include, for example, signals, images, speckle pattern images, interferometric patterns, intensity signals, etc. (e.g., as described below with respect to FIG. 3C and FIG. 4H).

System 100 may include an analysis unit 130. Analysis unit 130 may be coupled to inspection unit 110. Analysis unit 130 may receive multiple first detector outputs 119 from detector 118. Analysis unit 130 may determine at least one first region of multiple first regions 92 of object 90 that includes at least one zone 80, based on at least one of multiple first detector outputs 119. At least one zone 80 may be, for example, a defect, crack, inclusion, inhomogeneity, delamination, etc. in object 90. For example, FIGS. 1A-1C show at least one zone 80 in third first region 92c in object 90. Analysis unit 130 may further determine a specific depth of at least one zone 80 below a surface of object 90 based on the at least one first detector output that corresponds to the at least one first region that includes at least one zone 80, and/or based on acoustic properties of at least one zone 80.

Multiple first regions 92 may have predetermined first regions shapes (e.g., rectangular shape (as shown in FIGS. 1A-1C), circular shape, elliptic shape, etc.) and predetermined first regions dimensions. In some embodiments, the predetermined first regions dimensions may be substantially larger as compared to dimensions of at least one zone 80 to be detected. For example, the dimensions of at least one zone 80 may be 1×1 millimeter and the predetermined first regions dimensions may be 100×100 millimeter. The first resolution (e.g., the first region dimensions) may be determined to enable the detection of at least one zone 80 in object 90 and/or the determination of the specific depth of at least one zone 80 in object 90, while allowing relatively fast scanning of the whole (or substantially the whole) of object 90.

In some embodiments, the first predetermined resolution may be not high enough to, for example, enable further detailed characterization of at least one zone 80. For example, the first predetermined resolution may be not high enough to determine the exact shape and/or dimensions of at least one zone 80.

According to some embodiments, inspection unit 110 may scan the at least one first region that includes at least one zone 80 (e.g., third first region 92c, as shown in FIGS. 1A-1C) at a second predetermined resolution that is higher as compared to the first predetermined resolution (e.g., to thereby perform detailed characterization of at least one zone 80) by alternately and repeatedly photo-acoustically exciting and sensing each of predetermined multiple second regions 94 (e.g., shown in FIGS. 1B-1C) in the at least one first region thereof with at least one excitation laser beam 112a and at least one sensing laser beam 114a, respectively. For example, FIGS. 1B-1C show the scanning of one of multiple second regions 94 within third first region 92c having at least one zone 80.

In some embodiments, excitation laser beam 112a (generated by excitation laser source 112) and sensing beam 114a (generated by sensing laser source 114) may illuminate substantially the same location to scan a specific second region of multiple second regions 94. For example, excitation laser source 112 may photo-acoustically excite the second region of multiple second regions 94 being scanned with excitation laser beam 112a and sensing laser source 114 may further sense the second region thereof with sensing beam 114a (e.g., as shown in FIG. 1B). In another example, excitation laser source 112 may photo-acoustically excite the whole (or substantially the whole) first region having at least one zone 80 with excitation laser beam 112a and sensing laser source 114 may further sense the second region being scanned with sensing beam 114a (e.g., as shown in FIG. 1C). Alternatively or complementarily, the location being illuminated with excitation laser beam 112a and the location being illuminated with sensing beam 114a may be at a predetermined offset with respect to each other (not shown).

In various embodiments, a time delay between at least one sensing laser beam 114a and at least one excitation beam 112a may be determined based on the specific depth of at least one zone 80 below the surface of the object 90 (e.g., determined during the scanning of object 90 at the first predetermined resolution) and/or based on acoustic properties of object 90 (e.g., acoustic wave velocity in object 90).

Optical unit 116 may collect light 114b reflected from multiple second regions 94 being scanned (e.g., subsequently scanned) to detector 118. Detector 118 may generate, based on light 114b reflected from multiple second regions 94, corresponding multiple second detector outputs 129 (e.g., as shown in FIGS. 1B and 1C). In some embodiments, each of multiple second detector outputs 129 corresponds to one of multiple second regions 94.

Analysis unit 130 may receive multiple second detector outputs 129 from detector 118. Analysis unit 130 may determine, based on at least one of multiple second detector outputs 129, specific parameters of at least one zone 80. The specific parameters of at least one zone 80 may include, for example, the exact shape, exact dimensions, specific depth, acoustic properties, etc. of at least one zone 80.

Multiple second regions 94 may have predetermined second regions shapes (e.g., rectangular shape (as shown in FIGS. 1B-1C), circular shape, elliptic shape, etc.) and predetermined second regions dimensions. The predetermined second regions dimensions may be substantially smaller as compared to the first predetermined region dimensions. The dimensions of second regions 94 may be determined to allow determination of the exact shape and/or the exact dimensions of at least one zone 80. For example, dimensions of at least one zone 80 may be 1×1 millimeter, the first regions dimensions may be 100×100 mm and/or the second regions dimensions may be 10×10 millimeter. It is noted, that the first regions dimensions of 100×100 millimeters and the second regions dimensions of 10×10 millimeters are not limiting examples and that the first regions dimensions and the second regions dimensions may be determined based on dimensions of at least one zone 80 to be detected and/or based on the specific application of system 100 or of inspection unit 110.

Figure 2:
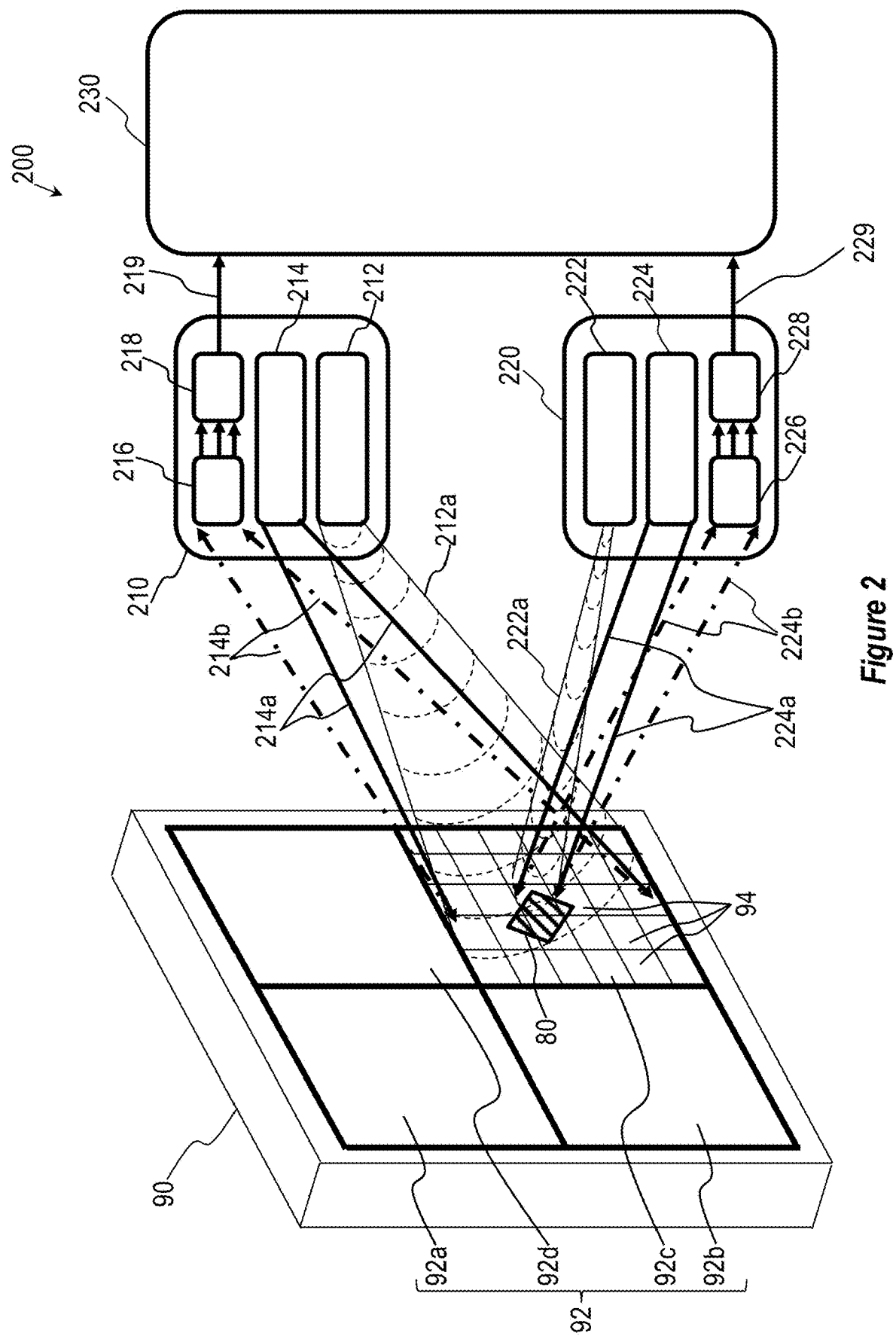
FIG. 2 is a schematic illustration of a system for inspecting an object and including a first inspection unit and a second inspection unit, according to some embodiments of the invention.

Reference is now made to FIG. 2, which is a schematic illustration of a system 200 for inspecting an object 90 and including a first inspection unit 210 and a second inspection unit 220, according to some embodiments of the invention.

System 200 may include a first inspection unit 210, a second inspection unit 220 and/or an analysis unit 230 coupled to first inspection unit 210 and/or to second inspection unit 220. First inspection unit 210 may be configured to scan object 90 at the first predetermined resolution to determine at least one region in object 90 having at least one zone 80 (e.g., as described above with respect to FIG. 1A). Second inspection unit 220 may be configured to scan the at least one region of object 90 having at least one zone 80 at the second predetermined resolution to determine the specific parameters (e.g., the exact shape and/or dimensions) of at least one zone 80 (e.g., as described above with respect to FIGS. 1B-1C). In various embodiments, first inspection unit 210 and second inspection unit 220 and/or analysis unit 230 may be similar to inspection unit 110 and analysis unit 130, respectively, described above with respect to FIGS. 1A-1C.

First inspection unit 210 may include an excitation laser source 212, a sensing laser source 214 and/or an optical unit 216 in association with a detector 218. In various embodiments, excitation laser source 212, sensing laser source 214, optical unit 216 and/or detector 218 may be similar to excitation laser source 112, sensing laser source 114, optical unit 116 and detector 118, respectively, as described above with respect to FIGS. 1A-1C.

First inspection unit 210 scans object 90 at the first predetermined resolution by alternately and repeatedly photo-acoustically exciting and sensing each of predetermined multiple first regions 92 on object 90 with a first excitation laser beam 212a and a first sensing laser beam 214a, respectively.

In various embodiments, the location being illuminated by excitation laser source 212 with at least one excitation laser beam 212a may at least partly overlap or be at a predetermined offset with respect to the location being illuminated by sensing laser source 214 with at least one sensing laser beam 214a to scan a specific first region of multiple first regions 92 (e.g., as described above with respect to FIG. 1A).

Optical unit 216 may collect light 214b reflected from multiple first regions 92 being scanned to detector 218. Detector 218 may generate, based on reflected light 214b, multiple first detector outputs 219 (e.g., that may be similar to multiple first detector outputs 119, as described above with respect to FIG. 1A).

Analysis unit 230 may receive multiple first detector outputs 219 from detector 218 and may further determine, based on at least one of multiple first detector outputs 219, at least one first region of multiple first regions 92 that includes at least one zone 80. Analysis unit 230 may further determine a specific depth of at least one zone 80 below a surface of object 90 based on the at least one first detector output that corresponds to the at least one first region having at least one zone 80 and/or acoustic properties of the at least one zone 80.

Second inspection unit 220 may include an excitation laser source 222, a sensing laser source 224 and/or an optical unit 226 in association with a detector 228. In various embodiments, excitation laser source 222, sensing laser source 224, optical unit 226 and/or detector 228 may be similar to excitation laser source 112, sensing laser source 114, optical unit 116 and detector 118, respectively, described above with respect to FIGS. 1A-1C.

Second inspection unit 220 may scan the at least one first region that includes at least one zone 80, at the second predetermined resolution by alternately and repeatedly photo-acoustically exciting and sensing each of predetermined multiple second regions 94 in the at least one first region having at least one zone 80 with a second excitation laser beam 222a and a second sensing laser beam 224a, respectively.

In various embodiments, the location being illuminated by excitation laser source 222 with at least one excitation laser beam 222a may at least partly overlap or be at the predetermined offset with respect to the location being illuminated by sensing laser source 224 with at least one sensing laser beam 224a to scan a specific second region of multiple second regions 94 (e.g., as described above with respect to FIG. 1B). Alternatively or complementarily, excitation laser source 222 may illuminate the whole (or substantially the whole) first region having at least zone 80 with excitation laser beam 222a to thereby generate photo-acoustic excitation of object 90 in the at least the first region thereof and sensing laser source 224 may further sense the second region of multiple second regions 94 being scanned with sensing laser beam 224a (e.g., as described above with respect to FIG. 1C).

In various embodiments, a time delay between at least one sensing laser beam 224a and at least one excitation beam 222a sensing laser beam may be determined based on the specific depth of at least one zone 80 below the surface of object 90 (e.g., determined during the scanning of object 90 at the first predetermined resolution) and/or based on acoustic properties of object 90 (e.g., acoustic wave velocity in object 90).

Optical unit 226 may collect light 224b reflected from multiple second regions 94 being scanned to detector 228. Detector 228 may generate, based on reflected light 224b, multiple second detector outputs 229 (e.g., that may be similar to multiple second detector outputs 129 described above with respect to FIGS. 1B-1C). Analysis unit 230 may receive multiple second detector outputs 229 from detector 228 and may further determine, based on at least one of multiple second detector outputs 229, the specified parameters (e.g., the exact shape and/or dimensions) of at least one zone 80.

The following illustrations/description depict examples for inspection units that may be implemented in system 100 and/or in system 200 for inspecting an object (e.g., as described above with respect to FIGS. 1A-1C and FIG. 2). Each of system 100 and system 200 may be implemented using any embodiment of inspection unit described below according to the system's 100 and system's 200 specifications.

It is noted that the following description of the inspection units is not meant to be limiting in any way and that system 100 and system 200 may utilize any of interferometric methods and/or any of speckle pattern interferometric methods to scan the object at the first predetermined resolution and/or at the second predetermined resolution.

Figure 3A:
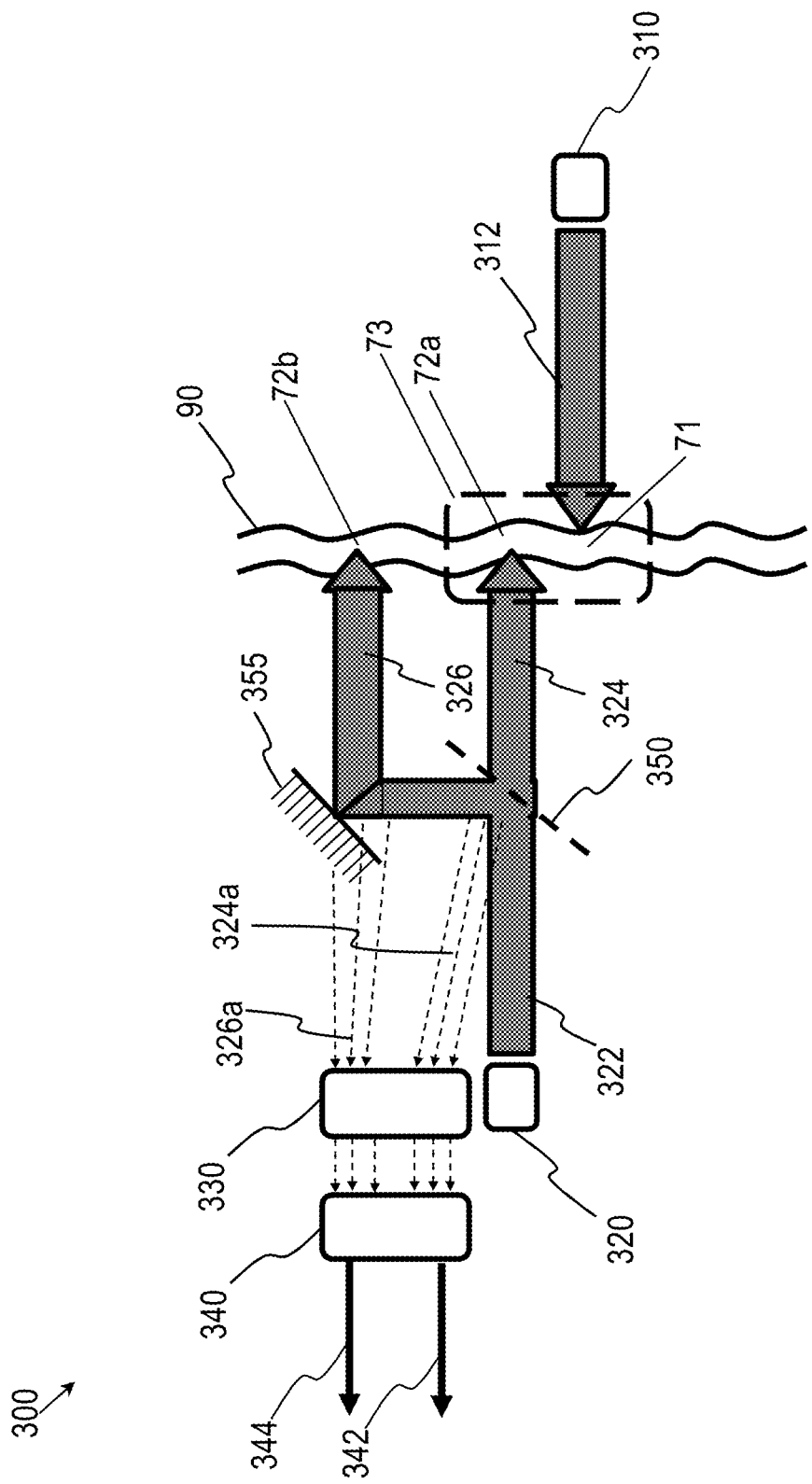
FIGS. 3A and 3B are various configurations of an inspection unit of a system for inspecting an object, according to some embodiments of the invention.
Figure 3B:
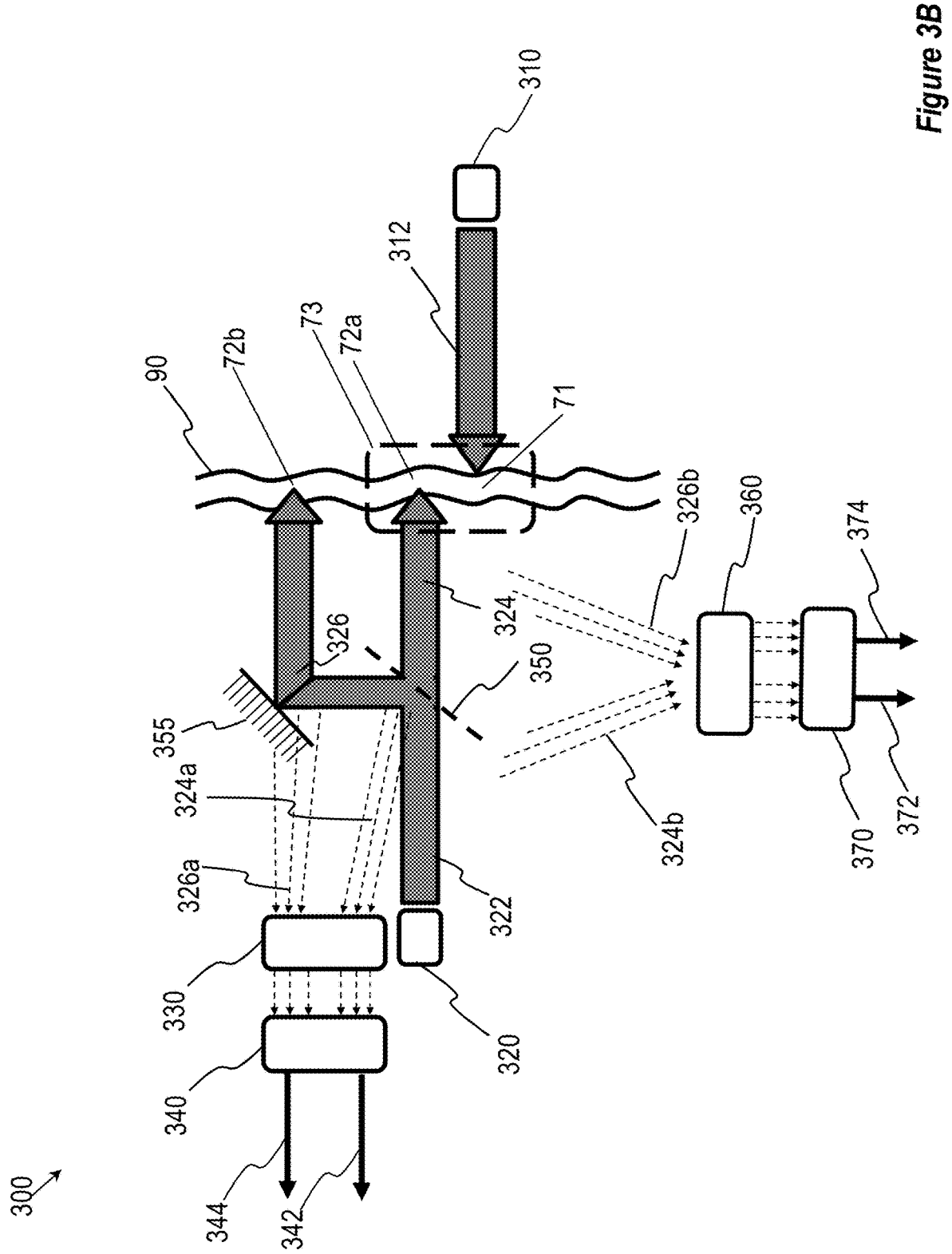

Reference is now made to FIG. 3A and FIG. 3B, which are various configurations of an inspection unit 300 of a system for inspecting an object 90, such as system 100 and system 200, according to some embodiments of the invention.

According to some embodiments, inspection unit 300 may be used as inspection unit 110 in system 100 and/or as first inspection unit 210 in system 200 to scan object 90 at the first predetermined resolution (e.g., as described above with respect to FIG. 1A and FIG. 2, respectively). In some embodiments, inspection unit 300 implements interferometric systems and methods to scan object 90.

Inspection unit 300 may include an excitation laser source 310, a sensing laser source 320, and an optical unit 330 in association with a detector 340 (e.g., as shown in FIGS. 3A-3B). In various embodiments, excitation laser source 310, sensing laser source 320, optical unit 330 and/or detector 340 may be similar to at least one of excitation laser sources 112, 212, sensing laser sources 114, 214 optical units 116, 216 and detectors 118, 218, respectively, described above with respect to FIG. 1A and FIG. 2, respectively.

The following description of various embodiments of inspection unit 300 (e.g., with respect to FIGS. 3A-3B) refers to scanning of a single predetermined region 73 on object 90. In some embodiments, predetermined region 73 may be one of multiple first regions 92 on object 90 to be scanned or being scanned (e.g., as described above with respect to FIG. 1A and FIG. 2). It would be understood that although the description is made with respect to the single predetermined region 73, it is not meant to be limiting and that inspection unit 300 may scan multiple predetermined regions 73 that may correspond to multiple first regions 92 on object 90 as, for example, described above with respect to FIG. 1A and FIG. 2.

Excitation laser source 310 may generate photo-acoustic excitation of object 90 in a predetermined region 73 by illuminating at least one predetermined position 71 in predetermined region 73 with at least one excitation laser beam 312.

Inspection unit 300 may include a beam splitter 350 and a mirror 355. Beam splitter 350 may split at least one sensing laser beam 322, generated by sensing laser source 320, into a first sensing beam 324 and a first reference beam 326. Beam splitter 350 may direct first sensing beam 324 to illuminate a predetermined sensing location 72a within predetermined region 73 to thereby sense at least a portion of predetermined region 73 (e.g., as shown in FIGS. 3A-3B). Mirror 355 may direct reference beam 326 to a predetermined reference location 72b on object 90. In some embodiments, predetermined reference location 72b associated with first reference beam 326 is at a predetermined distance from predetermined sensing location 72a associated with excitation laser beam position 322 such that predetermined reference location 72b is not affected by the photo-acoustic excitation of object 90 generated in the predetermined sensing location region 72a.

In various embodiments, the excitation and the sensing of object 90, by excitation laser source 310 and sensing laser source 320, respectively, may be performed at opposite sides of the object 90 (e.g., as shown in FIGS. 3A-3B) or on the same side of the object 90 (e.g., as shown in FIGS. 1A-1C and FIG. 2).

Optical unit 330 may collect sensing light 324a reflected from predetermined sensing location 72a (e.g., that is affected by the ultrasound excitation) and reference light 326a reflected from predetermined reference location 72b (e.g., that is external to predetermined region 73 and not affected by the photo-acoustic excitation in predetermined region 73) to detector 340. Detector 340 may generate a sensing detector output 342 and a reference detector output 344, based on sensing reflected light 324a and reference reflected light 326b, respectively. Alternatively or complementarily, detector 340 may generate an interference detector output based on the interference between sensing reflected light 324a and reference reflected light 326b (not shown).

The analysis unit of the system for inspecting object 90 (e.g., analysis unit 130 of system 100 (as described above with respect to FIGS. 1A-1C) and/or analysis unit 230 of system 200 (as described above with respect to FIG. 2)) may receive sensing detector output 342 and reference detector output 344 from detector 340.

The analysis unit may determine, based on at least one of sensing detector output 342 (e.g., that is affected by the photo-acoustic excitation), reference detector output 344 (e.g., that is not affected by the photo-acoustic excitation), a difference between sensing detector output 342 and reference detector output 344, and/or based on the interference detector output, a presence of at least one zone 80 in predetermined region 73. The analysis unit may further determine, based on the comparison thereof, the specific depth of at least one zone 80 below a surface of object 90.

In some embodiments, inspection unit 300 may include an additional optical unit 360 and an additional detector 370 in association with additional optical unit 360 (e.g., as shown in FIG. 3B). Additional optical unit 360 may collect light 324b reflected from predetermined sensing location 72a and light 326b reflected from predetermined reference location 72b to additional detector 370. In some embodiments, a phase between light 324a may be shifted by "π/2" with respect to a phase of light 324b, both reflected from predetermined sensing location 72a; and a phase between light 326a may be shifted by "π/2" with respect to a phase of light 326b, both reflected from predetermined reference location 72b.

Additional detector 370 may determine sensing detector output 372 and reference detector output 374, based on sensing reflected light 324b and reference reflected light 326b, respectively. Alternatively or complementarily, additional detector 370 may generate an interference detector output based on the interference between sensing reflected light 324b and reference reflected light 326b (not shown).

The analysis unit may receive sensing detector output 372 and reference detector output 374 from additional detector 370. The analysis unit may determine, based on at least one of sensing detector output 372, reference detector output 344, sensing detector output 362, reference detector output 364 and/or based on the interference detector outputs a presence of at least one zone 80 in predetermined region 73.

In some embodiments, detection of reflected light 324a, 326a, exhibiting phase shift of "π/2", with respect to detected reflected light 324b, 326b, respectively, by detector 340 and/or additional detector 370, respectively and further determination (e.g., by analysis unit 130 and/or analysis unit 230) of at least one zone 80 based on corresponding sensing detector output 342, reference detector output 344, additional sensing detector output 372 and additional reference detector output 374, may, for example, increase a sensitivity of at least one zone 80 detection by inspection unit 300.

In some embodiments, excitation laser source 310 may be a pulsed laser source. Pulsed excitation laser source 310 may generate excitation laser beam(s) 312 having a predetermined pulse duration. In some embodiments, the predetermined pulse duration ranges between 10-50 nanoseconds.

In some embodiments, excitation laser source 310 may be a modulated laser source. Modulated excitation laser beam(s) 312 may be generated by modulating an amplitude of excitation laser beam(s) 312, resulting in modulated excitation laser beam(s) 312 having a modulated intensity that varies with time between a first predetermined frequency value and a second predetermined frequency value (e.g., as described below with respect to FIG. 3C). In some embodiments, the second predetermined frequency value may be up to 50 MHz.

Figure 3C:
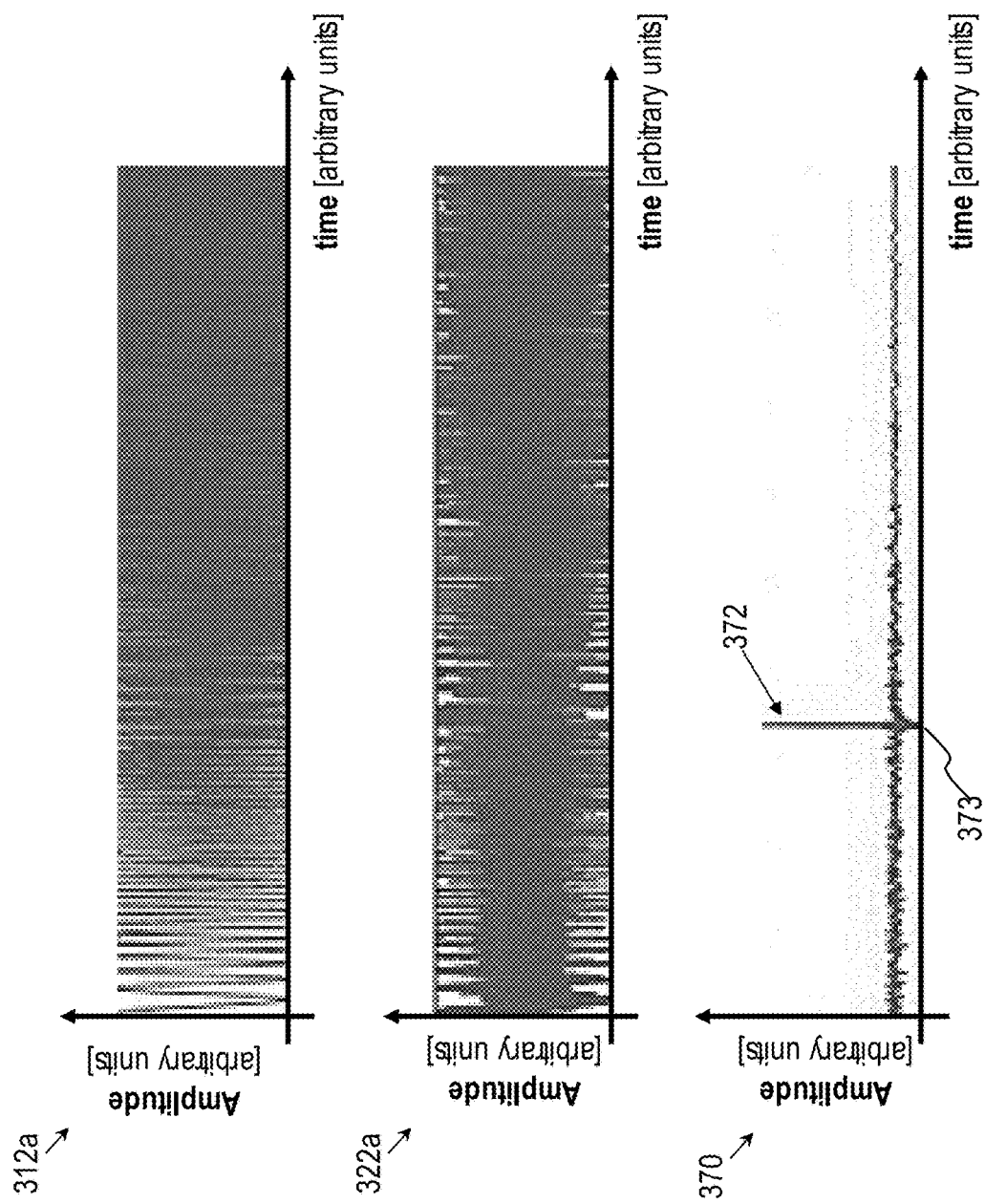
FIG. 3C shows graphs presenting simulation results of scanning a predetermined region having at least one zone on an object by an inspection unit of a system for inspecting object and having a modulated excitation laser source, according to some embodiments of the invention.

Reference is now made to FIG. 3C, which shows graphs presenting simulation results of scanning a predetermined region 73 having at least one zone 80 on an object 90 by an inspection unit, such as inspection unit 300, of a system for inspecting object 90, such as system 100 or system 200, and having a modulated excitation laser source 310, according to some embodiments of the invention.

FIG. 3C shows a first signal that corresponds to modulated excitation laser beam 312a as a function of time (e.g., generated by modulated excitation laser source 310) and having modulated intensity that varies with time between the first predetermined frequency value and the second predetermined frequency value.

FIG. 3C further shows a detector output 322a generated by detector 340 as a function of time. Detector output 322a may be generated based on light reflected from predetermined region 73 being scanned. Detector output 322a may include the first signal that corresponds to modulated excitation laser beam 312a, a second signal that includes a white noise (e.g., that may have an amplitude that is substantially larger (e.g., 5 folds) as compared to an amplitude of the first signal) and/or a third signal generated due to reflection of modulated excitation laser beam 312a from at least one zone 80 in object 90 (e.g., at least one zone 80 shown in FIGS. 1A-1C and 2).

FIG. 3C further shows an analysis result 370. Analysis result 370 may be generated by the analysis unit of the system for inspecting object 90 (e.g., analysis unit 130 of system 100 or analysis unit 230 of system 200) by comparing (e.g., using correlation or cross-correlation) the first signal that corresponds to excitation laser beam 312a and detector output 322a. Analysis result 370 may include at least one event 372 that may indicate a presence of at least one zone 80 in predetermined region 73 on object 90 being scanned. The analysis unit may further determine an event time point 373 of at least one region 372 and further determine, based on the event time point 373 thereof and the specific depth of at least one zone 80 below the surface of object 90.

Although the above description of various embodiments of inspection unit 300 (e.g., with respect to FIGS. 3A-3C) refers to scanning of object 90 at the first predetermined resolution, inspection unit 300 may be also used, according to some embodiments, as inspection unit 110 of system 100 and/or as second inspection 220 unit of system 200 to scan the at least one first region of multiple first regions 92 (e.g., that includes at least one zone 80) at the second predetermined resolution. In these embodiments, excitation laser source 310, sensing laser source 320, optical unit 330 and/or detector 340 may be similar to excitation laser source 222, sensing laser source 224, optical units 226 and detector 228, respectively, as described above with respect to FIG. 2, and predetermined region 73 may be one of multiple second regions 94 in the at least one first region thereof (e.g., as described above with respect to FIGS. 1B-1C and FIG. 2).

It is further noted that the description above of inspection unit 300 is not meant to be limiting in any way that system 100 and system 200 may utilize any of interferometric methods and/or any of speckle pattern interferometric methods to scan the object at the first predetermined resolution and/or at the second predetermined resolution.

Figure 4A:
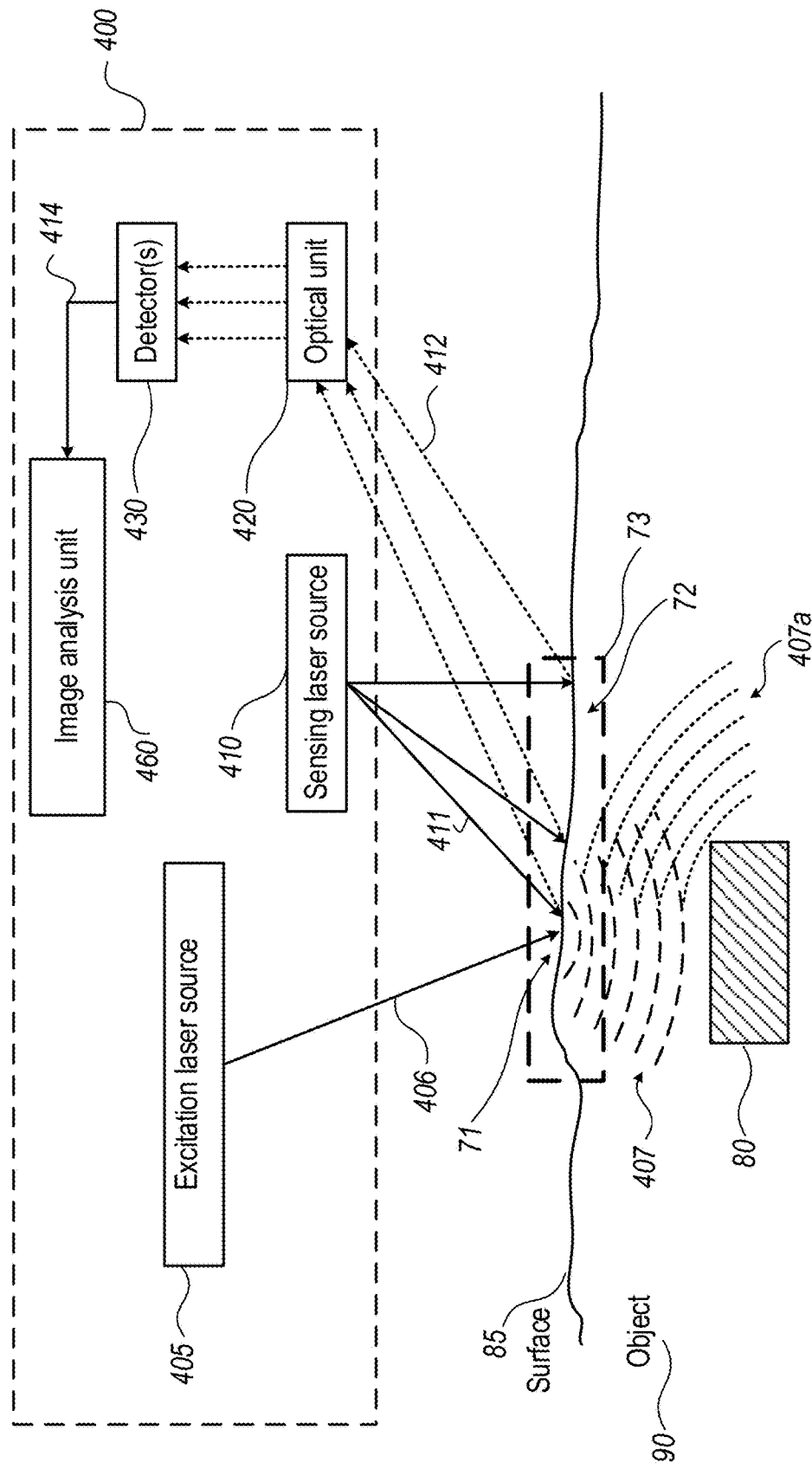
FIG. 4A is a schematic illustration of an inspection unit of a system for inspecting an object, according to some embodiments of the invention.

Reference is now made to FIG. 4A, which is schematic illustration of an inspection unit 400 of a system for inspecting an object 90, such as system 100 or system 200, according to some embodiments of the invention.

Inspection unit 400 may be used as at least one inspection unit 110 in system 100 (e.g., as described above with respect to FIGS. 1B-1C) and/or as second inspection unit 220 in system 200 (e.g., as described above with respect to FIG. 2) to scan the at least one first region having at least one zone 80 at the second predetermined resolution. In some embodiments, inspection unit 400 implements speckle pattern interferometry systems and methods to scan object 90.

Inspection unit 400 may include an excitation laser source 405, a sensing laser source 410, and an optical unit 420 in association with a detector 430 (e.g., as shown in FIG. 4A).

In various embodiments, excitation laser source 405, sensing laser source 410, optical unit 420 and/or detector 430 may be similar to at least one of excitation laser sources 112, 222, sensing laser sources 114, 224 optical units 116, 226 and detectors 118, 228, respectively, as described above with respect to FIGS. 1B, 1C and FIG. 2, respectively.

The following description of various embodiments of inspection unit 400 (e.g., with respect to FIGS. 4A-4R) refers to scanning of a single predetermined region 73 on object 90. In some embodiments, predetermined region 73 may be at least one of multiple second regions 94 within the at least one first region of multiple first regions 92 having at least one zone 80 (e.g., as described above with respect to FIGS. 1B-1C and FIG. 2). It would be understood that although the description is made with respect to single predetermined region 73, it is not meant to be limiting and that inspection unit 400 may scan multiple predetermined regions 73 that may correspond to multiple second regions 94, for example, as described above with respect to FIGS. 1B-1C and FIG. 2.

Excitation laser source 405 may illuminate at least one predetermined position 71 within predetermined region 73 on a surface of object 90 with at least one excitation beam 406 and generate thereby photo-acoustic excitation 407 of object 90 at least in predetermined region 73 (or a portion of predetermined region 73). Sensing laser source 410 may sense the surface deformation following to the photo-acoustic excitation on the predetermined region 73 (or at least a portion of region 73) by illuminating at least one predetermined location 72 in predetermined region 73 on the surface of object 90 with at least one sensing laser beam 411.

In various embodiments, a time delay between at least one sensing laser beam 411 with respect to at least one excitation beam 406 sensing laser beam may be determined based on the specific depth of at least one zone 80 below the surface of object 90 (e.g., determined during the scanning of object 90 at the first predetermined resolution, as described above with respect to FIG. 1A and FIG. 2) and/or based on acoustic properties of object 90 (e.g., as described below with respect to FIGS. 4O-4P).

Optical unit 420 may collect light 412 scattered (or reflected) from predetermined location(s) 72 to detector 430. Detector 430 may generate, based on scattered light 412, at least one sequence 414. At least one sequence 414 may be similar to second detector output 129, 229, as described above with respect to FIGS. 1B-1C and FIG. 2, respectively. Each of sequence(s) 114 may include at least two temporally-sequential de-focused speckle pattern images of one of predetermined illuminated location(s) 72. In some embodiments, detector 430 may be, for example, a camera. Alternatively or complementarily, detector 430 may be, for example, a single pixel detector configured to determine translation of speckle pattern images across the pixel thereof.

In some embodiments, inspection unit 400 may include an image analysis unit 460. It is noted that functions and methods performed by image analysis unit 460 of inspection unit 400 may be performed by the analysis unit of the system for inspecting object 90, for example by analysis unit 130 of system 100 (e.g., as described above with respect to FIGS. 1B-1C) and/or by analysis unit 230 of system 200 (e.g., as described above with respect to FIG. 2).

Image analysis unit 460 (or alternatively analysis unit 130 or analysis unit 230) may receive sequence(s) 414 and determine corresponding sets 415 of speckle pattern images translations. In some embodiments, each of sets 415 corresponds to one of sequence(s) 414. Each translation in each of set(s) 415 may be determined based on two temporally-sequential speckle patterns images in the respective sequence 414, and may include, for example, data regarding a measure of similarity of the two temporally-sequential speckle patterns images thereof as a function of the displacement of one relative to the other. In some embodiments, each of translations thereof may be determined using, for example a cross-correlation between two temporally-sequential speckle pattern images. Alternatively or complementarily, the translations of the speckle pattern images may be determined by applying, for example, at least one of a feature based registration, machine learning algorithm or other image registration technique on the sequence of the speckle pattern images thereof.

In some embodiments, imaging analysis unit 460 (or alternatively analysis unit 130 or analysis unit 230) may further determine, for example, an angular distortion of respective predetermined location 72 being scanned, based on each of set(s) 415 (e.g., using a cross-correlation between sequential translations in each of the sets thereof). Image analysis unit 460 (or alternatively analysis unit 130 or analysis unit 230) may further determine, for example, an intensity pattern of photo-acoustic excitation 407 propagating through respective predetermined location(s) 72, based on the angular distortion thereof.

In some embodiments, the determination of the angular distortion $\Delta\varphi$ may be based on, for example, translation $\Delta s$ of the speckle pattern across detector 430, a distance Z from the object to a predetermined imaging position and a magnification M of the optical system. For example, Equation 1 shows the angular distortion $\Delta\varphi$ as follows:

$$\Delta\varphi = \Delta s/2ZM \quad \text{(Equation 1)}$$

In some embodiments, photo-acoustic excitation 407 (e.g., induced by excitation laser beam 406) may be affected by at least one zone 80 within object 90 to provide modified photo-acoustic excitation 407a (e.g., as shown in FIG. 4A). Accordingly, in various embodiments, data concerning photo-acoustic excitation 407 (e.g., the intensity pattern of photo-acoustic excitation 407) and/or data concerning modified photo-acoustic excitation 407a (e.g., the intensity pattern of modified photo-acoustic excitation 407a) may be used to further identify zone(s) 80 in object 90. The schematic illustration of zone(s) 80 as having a volume is non-limiting, and zone 80 may well be a crack or a material inhomogeneity.

In some embodiments, imaging analysis unit 460 (or alternatively analysis unit 130 or analysis unit 230) may further compare at least two sets 115 of translations (e.g., where each of sets 115 corresponds to a different predetermined location 72 and to determine, based on the comparison thereof, a whole-body movement of predetermined location(s) 72 of object 90 (e.g., translational movements, rotational movements and/or vibrations of predetermined location(s) 72). Imaging analysis unit 460 (or alternatively analysis unit 130 or analysis unit 230) may further isolate and/or distinguish the whole body movement from photo-acoustic excitation 407 (and/or modified photo-acoustic excitation 407a) of predetermined location(s) 72 (e.g., as some of predetermined locations 72 may be affected by both whole-body movement and photo-acoustic excitation of object 90 while others may be affected by whole-body movements only).

Figure 4B:
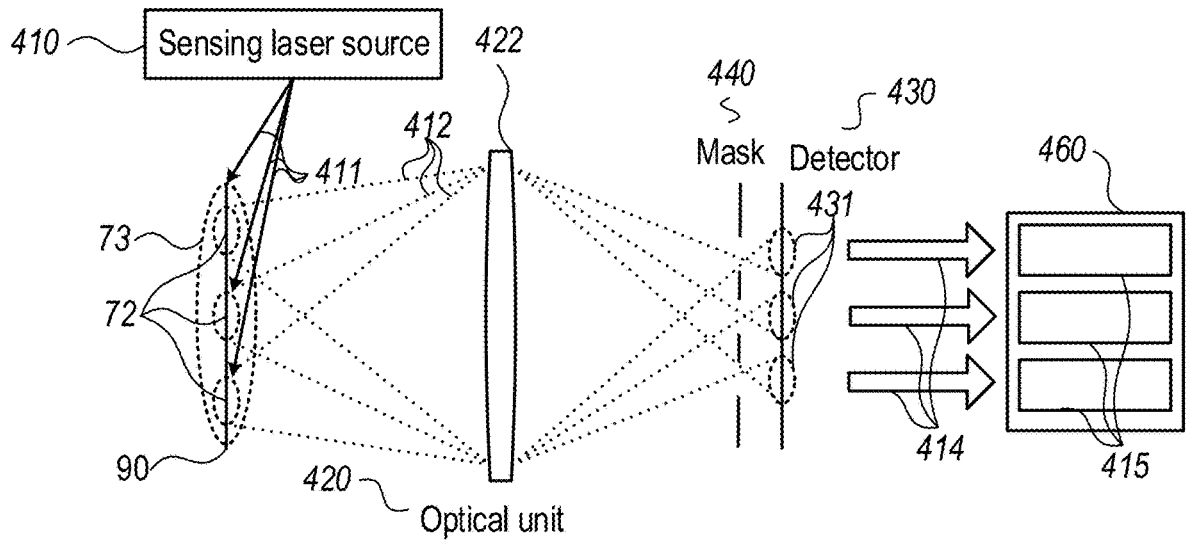
FIGS. 4B and 4C are schematic illustration of an inspection unit of a system for inspecting an object and including a sensing laser source that is configured to illuminate multiple predetermined locations in a predetermined region and multiple predetermined regions on object, respectively, with multiple narrow beams, according to some embodiments of the invention.
Figure 4C:
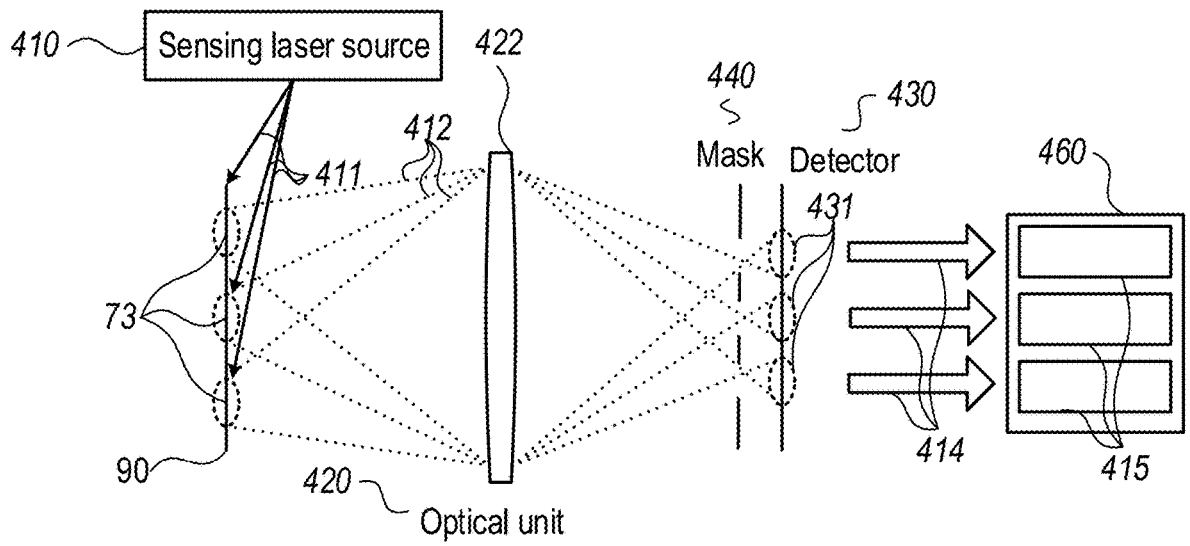

Reference is now made to FIGS. 4B and 4C, which are schematic illustration of an inspection unit 400 of a system for inspecting an object 90, such as system 100 or system 200, including a sensing laser source 410 that is configured to illuminate multiple predetermined locations 72 in a predetermined region 73 and multiple predetermined regions 73 on object 90, respectively, with multiple narrow beams 411, according to some embodiments of the invention.

Sensing laser source 410 may scan predetermined region 73 (or at least a portion of predetermined region 73) by illuminating multiple predetermined locations 72 within predetermined region 73 with multiple narrow beams 411, for example as illustrated in a non-limiting manner in FIG. 4B. Alternatively or complementarily, sensing laser source 410 may scan multiple predetermined regions 73 by illuminating multiple predetermined regions 73 with corresponding multiple narrow beams 411, for example as illustrated in a non-limiting manner in FIG. 4C.

Optical unit 420 (e.g., a lens 422) may include a mask 440 at a focusing plane of optical unit 420. Mask 440 may limit the dimensions of the light spots of the scattered (or reflected) beam of multiple scattered (or reflected) beams 412 to a predetermined region of multiple predetermined regions 431 on detector 430. Mask 440 may further avoid a cross-talk between multiple beams 412 scattered (or reflected) from different predetermined locations 72/predetermined regions 73. For example, for a two-dimensional (2D) array of light spots (e.g., predetermined illuminated locations 72/predetermined regions 73), mask 440 may include a corresponding 2D array of holes or apertures in corresponding positions on the mask 440 thereof.

Detector 430 may generate multiple sequences 414 of temporally-sequential speckle pattern images based on multiple scattered beams 412 detected in multiple regions 431, where each of multiple sequences 414 may correspond to one of multiple predetermined locations 72 on object 90 (e.g., as shown in FIG. 4B), or, alternatively, to one of multiple predetermined regions 73 (e.g., as shown in FIG. 4C).

Image analysis unit 460 (or alternatively analysis unit 130 or analysis unit 230) may determine multiple sets 415 of translations based on multiple sequences 414 of speckle pattern images, where each of sets 415 may correspond to one of sequences 414 (e.g., as shown in FIGS. 4B and 4C).

In some embodiments, imaging analysis unit 460 (or alternatively analysis unit 130 or analysis unit 230) may compare multiple sets 415 of translations (e.g., where each of sets 415 corresponds to one of sequences 414 and to one of predetermined locations 72/predetermined regions 73, respectively) and to determine, based on the comparison thereof, a whole-body movement of predetermined location(s) 72 of object 90 (e.g., translational movements, rotational movements and/or vibrations of predetermined location(s) 72/predetermined regions 73), while isolating and/or distinguishing the whole-body movement from the photo-acoustic excitation (e.g., photo-acoustic excitation 407 and/or modified photo-acoustic excitation 407a, as described above with respect to FIG. 4A) of predetermined location(s) 72/predetermined regions 73 (e.g., as some of predetermined locations 72/predetermined regions 73 may be affected by both whole-body movement and photo-acoustic excitation of object 90 while others may be affected by whole-body movements only).

Figure 4D:
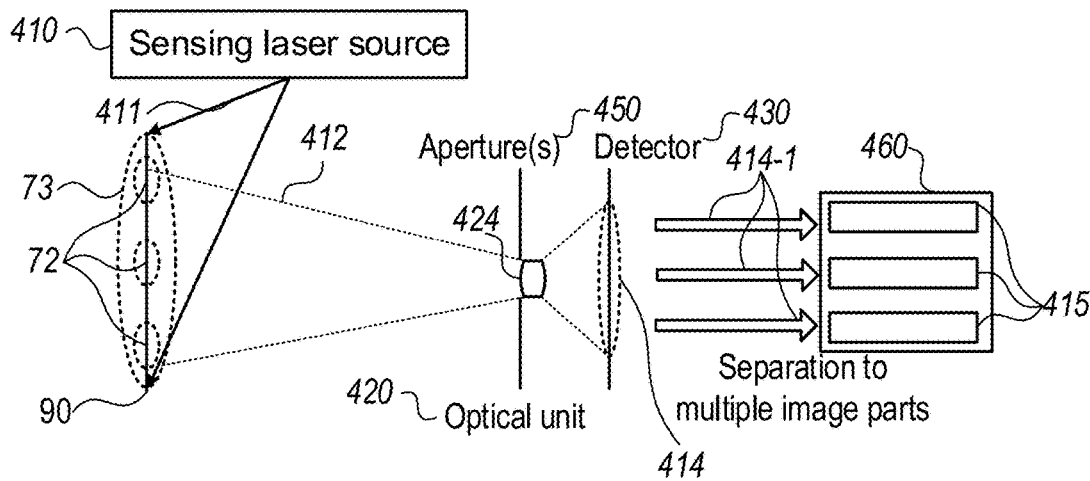
FIGS. 4D and 4E are schematic illustrations of an inspection unit of a system for inspecting an object and including a sensing laser source that is configured to illuminate multiple predetermined locations in a predetermined region and multiple predetermined regions on object, respectively, with a single wide sensing laser beam, according to some embodiments of the invention.
Figure 4E:
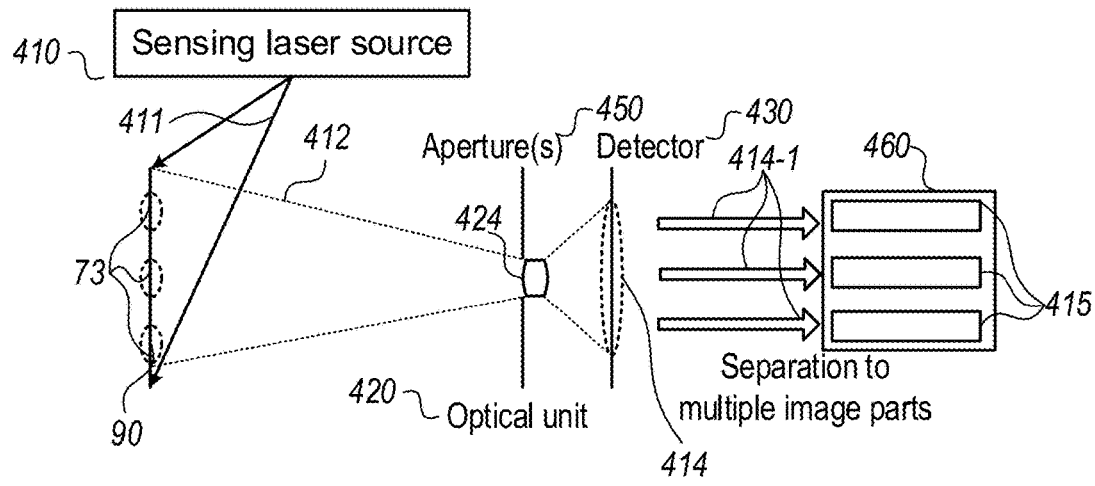

Reference is now made to FIGS. 4D and 4E, which are schematic illustrations of an inspection unit 400 of a system for inspecting an object 90, (such as system 100 or system 200), including a sensing laser source 410 that is configured to illuminate multiple predetermined locations 72 in a predetermined region 73 and multiple predetermined regions 73 on object 90, respectively, with a single wide sensing laser beam 411, according to some embodiments of the invention.

Sensing laser source 410 may scan predetermined region 73 (or at least a portion of predetermined region 73) on object 90 by illuminating multiple predetermined locations 72 in predetermined region 73 with a single wide beam 411, e.g., as illustrated in a non-limiting manner in FIG. 4D. Alternatively or complementarily, sensing laser source 410 may scan multiple predetermined region 73 on object 90 by illuminating multiple predetermined regions 73 with a single wide beam 411, e.g., as illustrated in a non-limiting manner in FIG. 4E.

Optical unit 420 may further include an aperture 450 in front of detector 430 (possibly accompanied by optical element(s) such as a lens 424). Aperture 450 may increase an f-number of optical unit 420 to, for example, enable diminishing a crosstalk between multiple predetermined locations 72/predetermined regions 73 on the surface of object 90, such that a single sequence 414 of temporally-sequential speckle pattern images will be generated. In these embodiments, each of the speckle pattern images in the sequence 414 may include data regarding all multiple predetermined locations 72 in predetermined region 73/predetermined regions 73 illuminated by single wide beam 411 and in which specific portions of the speckle pattern images correspond to multiple predetermined locations 72/predetermined regions 73 on object 90.

In some embodiments, each of the speckle pattern images in the sequence 414 may include multiple image parts 414-1, where each image part of multiple image parts 414-1 may correspond to one of multiple predetermined locations 72/predetermined regions 73 on object 90. The image parts thereof may be processed separately (e.g., as described above with respect to FIGS. 4A and 4B) to provide multiple sets 415 of translations (e.g., where each of sets 415 corresponds to one of multiple predetermined locations 72/predetermined regions 73).

Image analysis unit 460 (or alternatively analysis unit 130 or analysis unit 230) may determine a whole-body movement of predetermined location(s) 72/predetermined regions 73 of object 90 (e.g., based on multiple sets 415 thereof), and distinguish them from the photo-acoustic excitation (e.g., photo-acoustic excitation 407 or modified photo-acoustic excitation 407a, as described above with respect to FIG. 4A).

Figure 4H:
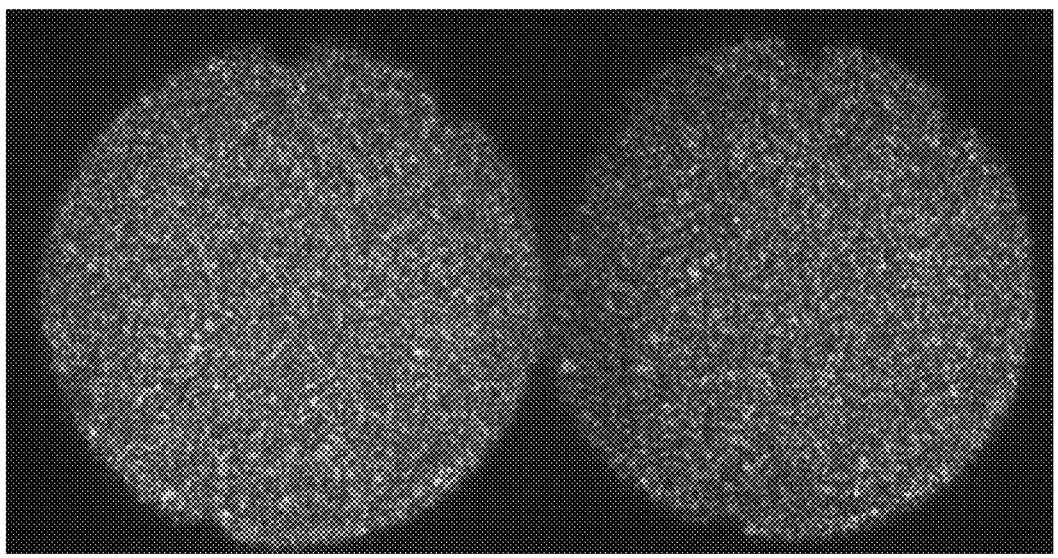
FIG. 4H is an example of speckle patterns images received from scattered (or reflected) sensing beam and scattered (or reflected) first reference beam, according to some embodiments of the invention.

Reference is now made to FIG. 4F and FIG. 4G, which are schematic illustrations of an inspection unit 400 of a system for inspecting an object 90, such as system 100 and system 200, including a beam splitter to split sensing laser beam 411 into a first sensing beam 411a and a first reference beam 411b, according to some embodiments of the invention; and to FIG. 4H which an example of speckle patterns images received from scattered (or reflected) sensing beam 412a and scattered (or reflected) first reference beam 412b, according to some embodiments of the invention.

The whole-body movement of object 90 (or predetermined location(s) 72 of object 90) and/or beam spatial wandering may be determined and distinguished from the photo-acoustic excitation (e.g., photo-acoustic excitation 407 or modified photo-acoustic excitation 407a, as described above with respect to FIG. 4A) by, for example, splitting sensing laser beam 411 into, for example, two beams, indicated as a first sensing beam 411a and a first reference beam 411b in FIG. 4F and FIG. 4G. The splitting may be carried out by any optical element(s) 416, for example, a beam splitter 416 (e.g., as shown in FIGS. 4F, 4G).

Beam splitter 416 may split the beam and may direct scanning first sensing beam 411a to a predetermined location 72a in predetermined region 73. Predetermined location 72a being illuminated with first sensing beam 411a may be close to excitation laser beam 406 (e.g., as shown in FIGS. 4F, 4G) such that predetermined location 72a is affected by the photo-acoustic excitation (e.g., photo-acoustic excitation 407 or modified photo-acoustic excitation 407a, as described above with respect to FIG. 4A) induced by excitation laser beam 406. Image analysis unit 460 (or alternatively analysis unit 130 and/or analysis unit 230) may thereby determine set 415a of translations derived from sequence 414a of speckle pattern images based on scattered first sensing beam 412a that is affected both by the whole-body movement and by the photo-acoustic excitation (e.g., photo-acoustic excitation 407 or modified photo-acoustic excitation 407a, as described above with respect to FIG. 4A).

Mirror 415 may direct scanning first reference beam 411b to a predetermined location 72b. Predetermined location 72b being illuminated with scanning reference beam 411b may be far from excitation laser beam 406, for example external to predetermined region 73 (e.g., as shown in FIGS. 4F, 4G) such that predetermined location 72b is not affected by the photo-acoustic excitation (e.g., photo-acoustic excitation 407 or modified photo-acoustic excitation 407a, as described above with respect to FIG. 4A) induced by excitation laser beam 406. Image analysis unit 460 (or alternatively analysis unit 130 and/or analysis unit 230) may thereby determine set 415b of translations derived from sequence 414b of speckle pattern images based on scattered reference beam 412b affected by the whole-body movement of object 90 and not by the photo-acoustic excitation (e.g., photo-acoustic excitation 407 or modified photo-acoustic excitation 407a, as described above with respect to FIG. 4A).

Image analysis unit 460 (or alternatively analysis unit 130 and/or analysis unit 230) may further compare set 415a of translations (e.g., affected by both by the whole-body movement and by the photo-acoustic excitation) and set 415b of translations (e.g., affected by the whole-body movement of object 90 and not by the photo-acoustic excitation) and further distinguish, based on the comparison thereof, the whole-body movement of object 90 from the photo-acoustic excitation of object 90.

It is noted that this approach may be applied to either or both cases of illumination 411 at an opposite side of object 90 with respect to excitation 406 and illumination 411 at the same side of object 90 with respect to excitation 406, as illustrated schematically in FIG. 4F and FIG. 4G, respectively.

The example of speckle patterns images received from scattered sensing beam 412a and scattered reference beam 412b is shown in FIG. 4H.

Figure 4I:
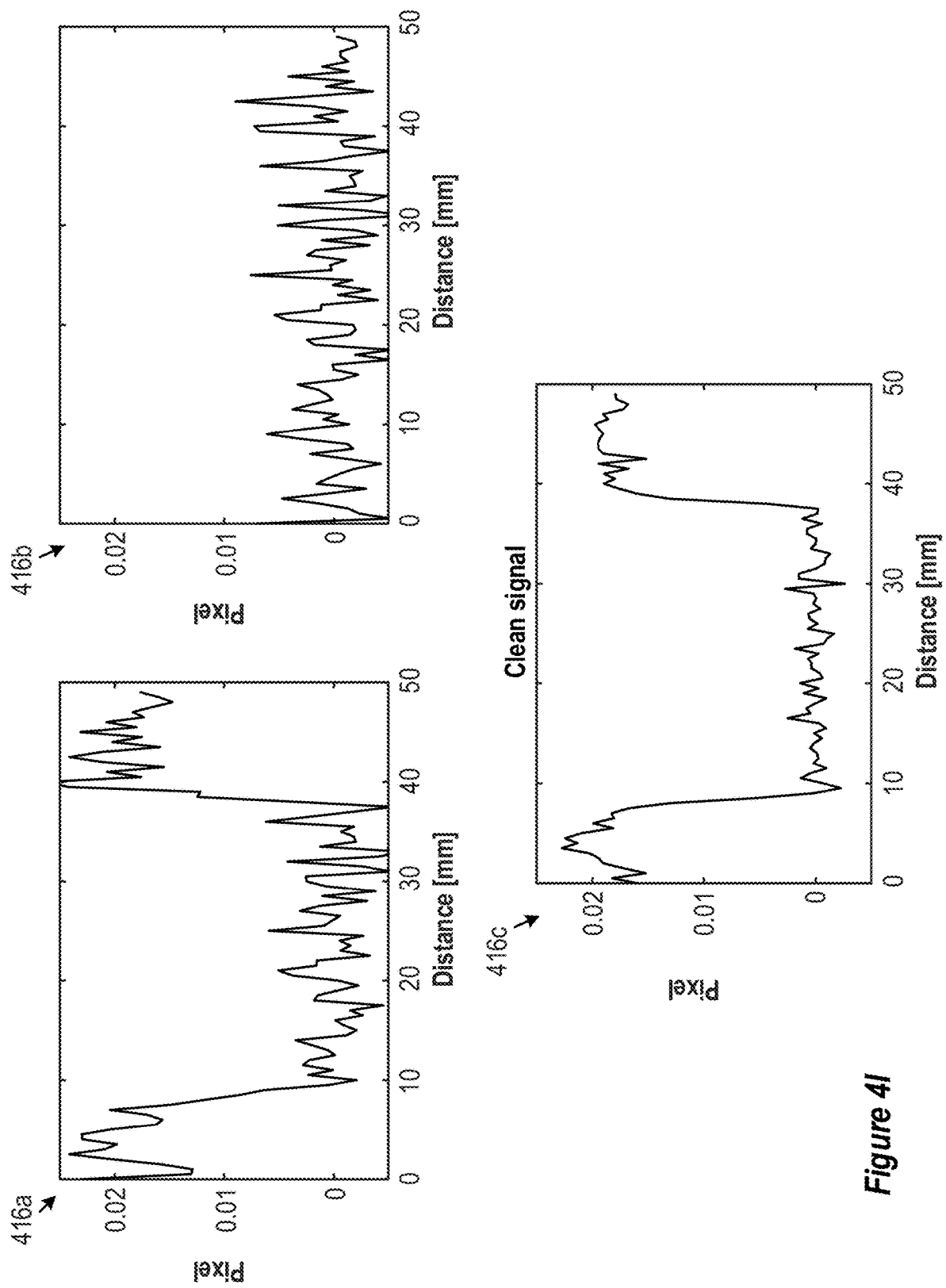
FIGS. 4I and 4J are graphs presenting signals determined by an image analysis unit of inspection unit for the system for inspecting an object based on sequence(s) of temporally-sequential speckle pattern images obtained from a predetermined region on object, according to some embodiments of the invention.
Figure 4J:
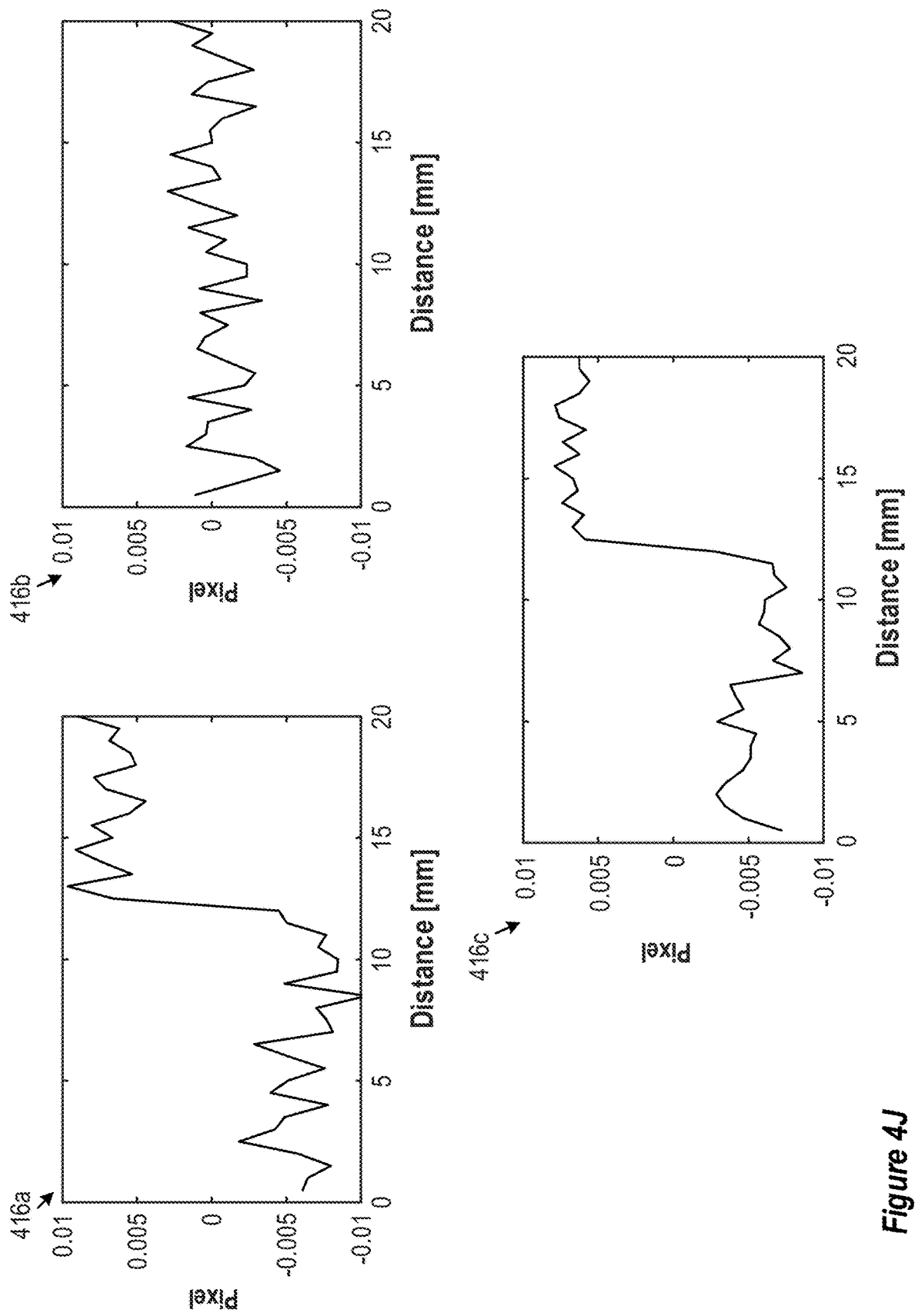

Reference is now made to FIG. 4I and FIG. 4J, which are graphs presenting signals determined by an image analysis unit 460 of inspection unit 400 for the system for inspecting an object 90, such as system 100 and system 200, based on sequence(s) 414 of temporally-sequential speckle pattern images obtained from a predetermined region 73 on object 90, according to some embodiments of the invention.

Image analysis unit 460 (or alternatively analysis unit 130 or analysis unit 230) may determine signals 416a and 416b based on sequences 414a and 414b of temporally-subsequent speckle patterns images, or optionally based on sets 415a and 415b of translations, respectively, received from first sensing beam 411a and reference beam 412a, respectively (e.g., as described above with respect to FIGS. 4F, 4G).

Image analysis unit 460 (or alternatively analysis unit 130 or analysis unit 230) may further determine a signal 416c (e.g., based on signals 416a and 416b) that may include, for example, data regarding zone(s) 80 in object 90 (e.g., as described above with respect to FIG. 4A). For example, subtracting signal 416b (e.g., determined based on scattered or reflected reference beam 412b) from signal 416a (e.g., determined based on scattered or reflected sensing beam signal 412a) may provide signal 416c cleaned from noise and/or from whole-body movement disturbances (such as originating from whole-object vibration, sensing beam spatial wandering and other noise sources).

FIG. 4I illustrates signals 416a, 416b and 416c determined based on sequence 414 of temporally-sequential speckle patterns images obtained from predetermined region 73 over a 50 mm long line on the surface of sampled object 90, when excitation and illumination are from opposite sides (e.g., as shown in FIG. 4F). In signal 416c, a central, approximately 30 mm wide region (approximately between 10 mm and 40 mm on the x axis) indicates a defect (such as zone 80) in object 90 which causes a decrease in the signal amplitude. It is noted that the clean signal provides a better indication of defect 80 than the original signal.

FIG. 4J illustrates signals 416a, 416b and 416c determined based on sequence 414 of temporally-sequential speckle patterns images obtained from predetermined region 73 over a 50 mm long line on the surface of sampled object 90, when excitation and illumination are from the same side (e.g., as shown in FIG. 4G). In signal 416c, a transition (approximately at 12 mm on the x axis) indicates an edge of defect 80 in object 90 which causes an increase in the signal amplitude (defect 80 on the right-hand side of the diagram). It is noted that the clean signal provides a better indication of defect 80 than the original signal.

Figure 4K:
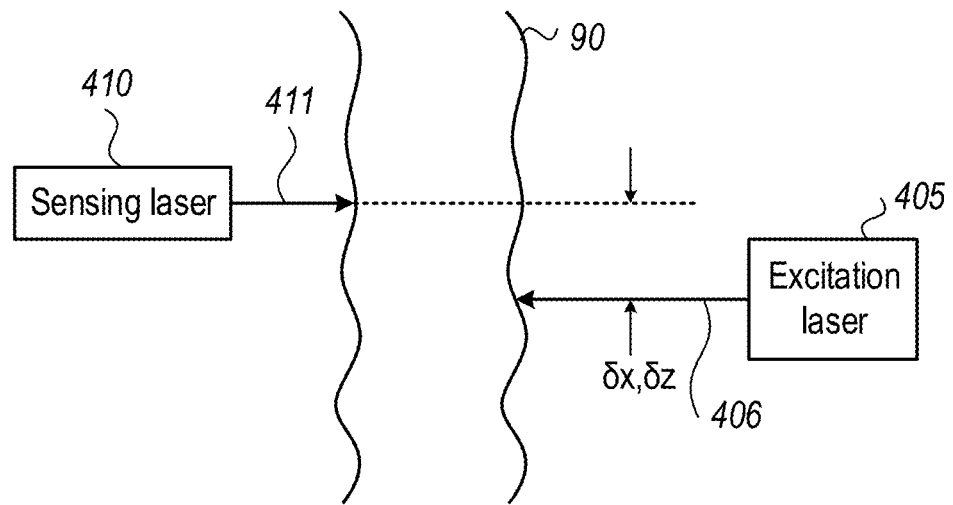
FIGS. 4K and 4L are schematic illustrations of lateral shifts between excitation laser beam and sensing laser beam in different configurations of inspection unit of a system for inspecting an object, according to some embodiments of the invention.
Figure 4L:
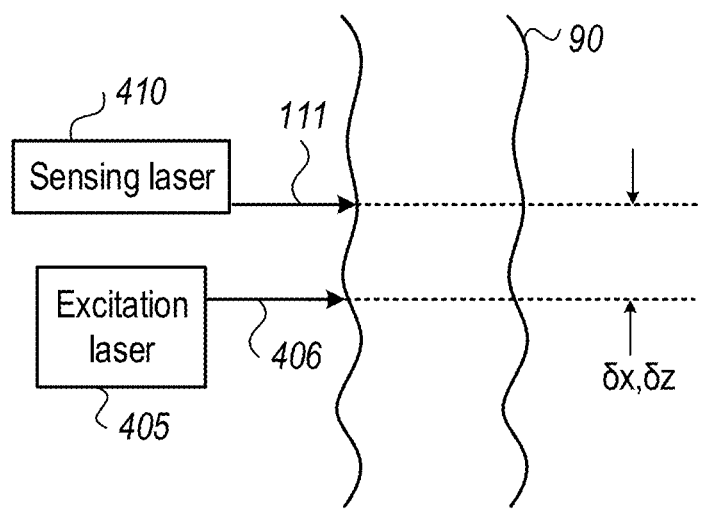
Figure 4M:
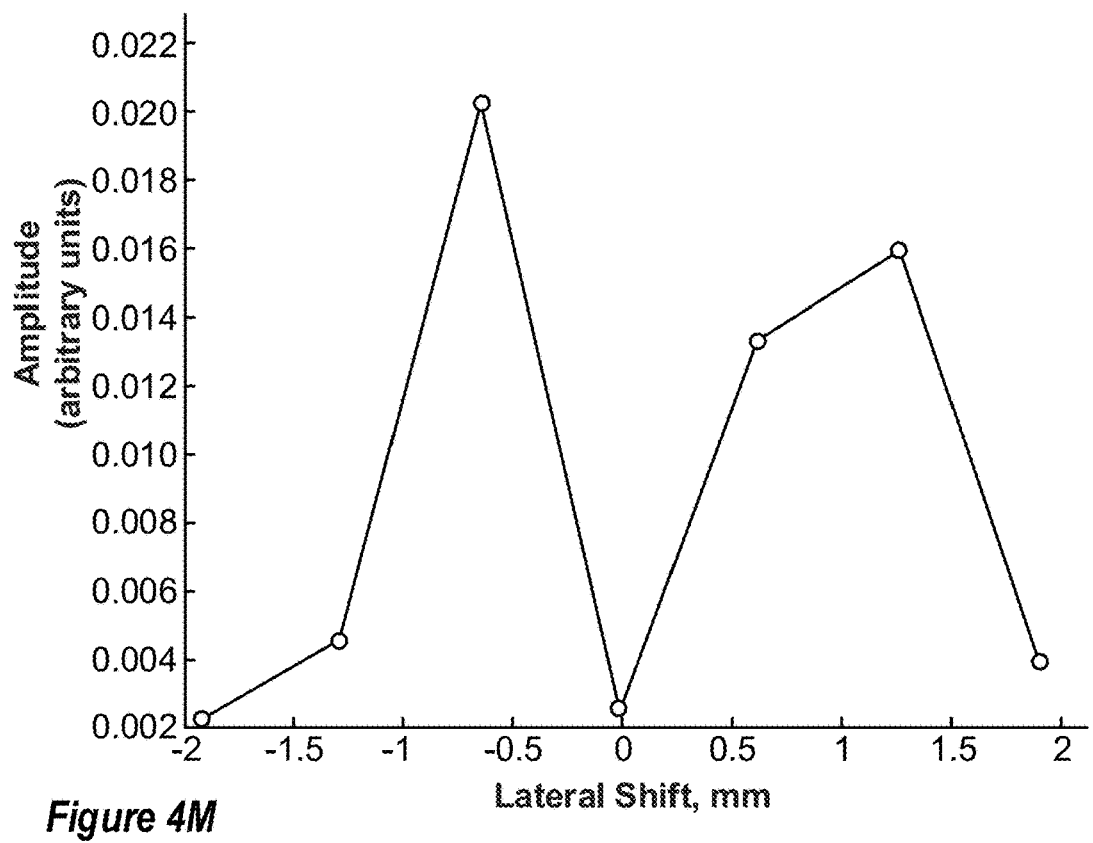
FIGS. 4M and 4N are graphs illustrating simulation results concerning the dependency of an inspection unit of a system for inspecting an object on the lateral shift between excitation laser beam and sensing laser beam, according to some embodiments of the invention.
Figure 4N:
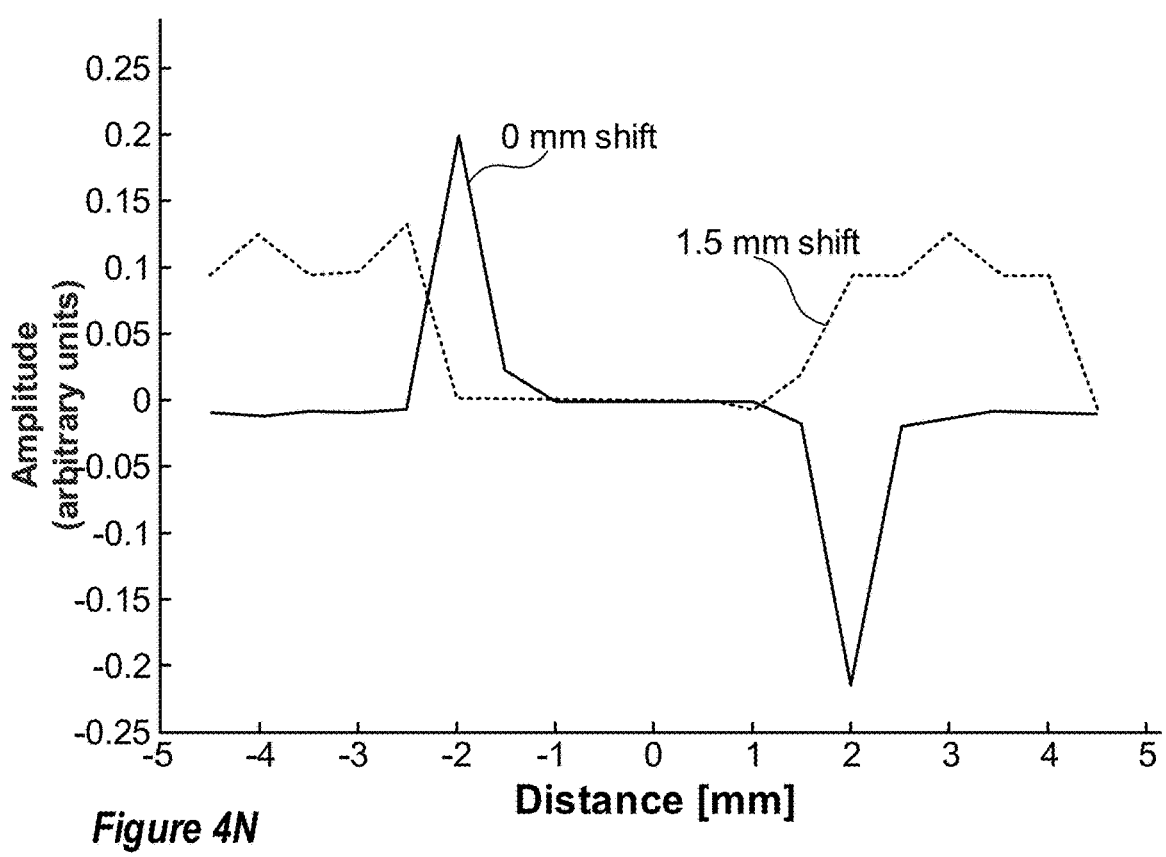

Reference is now made to FIG. 4K and FIG. 4L, which are schematic illustrations of lateral shifts between excitation laser beam 406 and sensing laser beam 411 in different configurations of inspection unit 400 of a system for inspecting an object 90, such as system 100 and system 200, according to some embodiments of the invention; and to FIG. 4M and FIG. 4N, which are graphs illustrating simulation results concerning the dependency of an inspection unit 400 of a system for inspecting an object 90, such as system 100 and system 200, on the lateral shift between excitation laser beam 406 and sensing laser beam 411, according to some embodiments of the invention.

It is noted that the lateral shifts may be measured either or both cases of sensing laser beam 411 at an opposite side of object 90 with respect to excitation laser beam 406 and sensing laser beam 411 at the same side of object 90 with respect to excitation laser beam 406, as illustrated schematically in FIG. 4D and FIG. 4E, respectively. The lateral shift, denoted schematically as δx, δz (e.g., δx for the shift in the plane of the page, δz for the shift orthogonal to the plane of the page), between excitation laser beam 406 and sensing laser beam 411 may be determined and controlled by inspection unit 400. For example, an optimal shift between excitation and scanning beams 406, 411 (respectively) may be set to provide the maximal signal of translation derived from correlation between speckle patterns 414.

FIG. 4M is an example for simulation result concerning the dependency of an amplitude of signal 416a (determined based on scattered sensing beam 412a) on the lateral shift between excitation laser beam 406 and sensing laser beam 411, with object 90 having a thickness of 3 mm without a defect 80 when excitation and scanning are from opposite sides, according to some embodiments of the invention. The derived dependency may be used to determine the optimal shift for the relative positioning of beams 406, 411. As illustrated schematically in the non-limiting example of FIG. 4M, a zero-lateral shift (overlapping beams 406, 411) may cause the signal to be negligible, while other values of the lateral shift (e.g., approximately −0.5 mm, approximately 1 mm) provide a significant signal.

FIG. 4N is an example of a simulation result concerning a 10 mm long line on the surface, with object 90 having a 4 Om wide inner defect 80 and with excitation laser beam 406 having a 0.1 μsec width pulses, according to some embodiments of the invention. FIG. 4N illustrates the dependency of an amplitude of signal 416a, determined based on scattered sensing beam 412a, on the lateral shift between excitation laser beam 406 and sensing laser beam 411. The optimal shift between excitation and scanning beams 406, 411, respectively, in the illustrated non-limiting case is about 1.5 mm, to maximally enhance the defect in signal 416a. The resulting signal shape, illustrated in FIG. 4N by the 1.5 mm shift line, indicates defect 80 and may resemble the clean signal illustrated in FIG. 4L. It is noted that when the lateral shift is 0 mm, the signal is negligible except when the excitation and sensing beams are right over the defect edges, and therefore such configurations may be used specifically to detect defect edges—as illustrated by the two peaks in FIG. 4N (at −2 mm and +2 mm) for the 0 mm shift.

In some embodiments, the optimal lateral shift (e.g., at which the maximal signal 416a is obtained) may depend on the specific depth of zone(s) 80 within object 90. Accordingly, in some embodiments, the lateral shift (e.g., the distance between predetermined location 71 being illuminated with excitation laser beam 406 and predetermined location 72 being illuminated (or to be illuminated) with sensing laser beam 411) may be predetermined based on the specific depth of zone(s) 80 in object 90. In some embodiments, the specified depth of zone(s) 80 may be determined during the scanning of object 90 at the first predetermined resolution (e.g., as described above with respect to FIGS. 1A-1C, FIG. 2 and FIGS. 3A-3B).

Figure 4P:
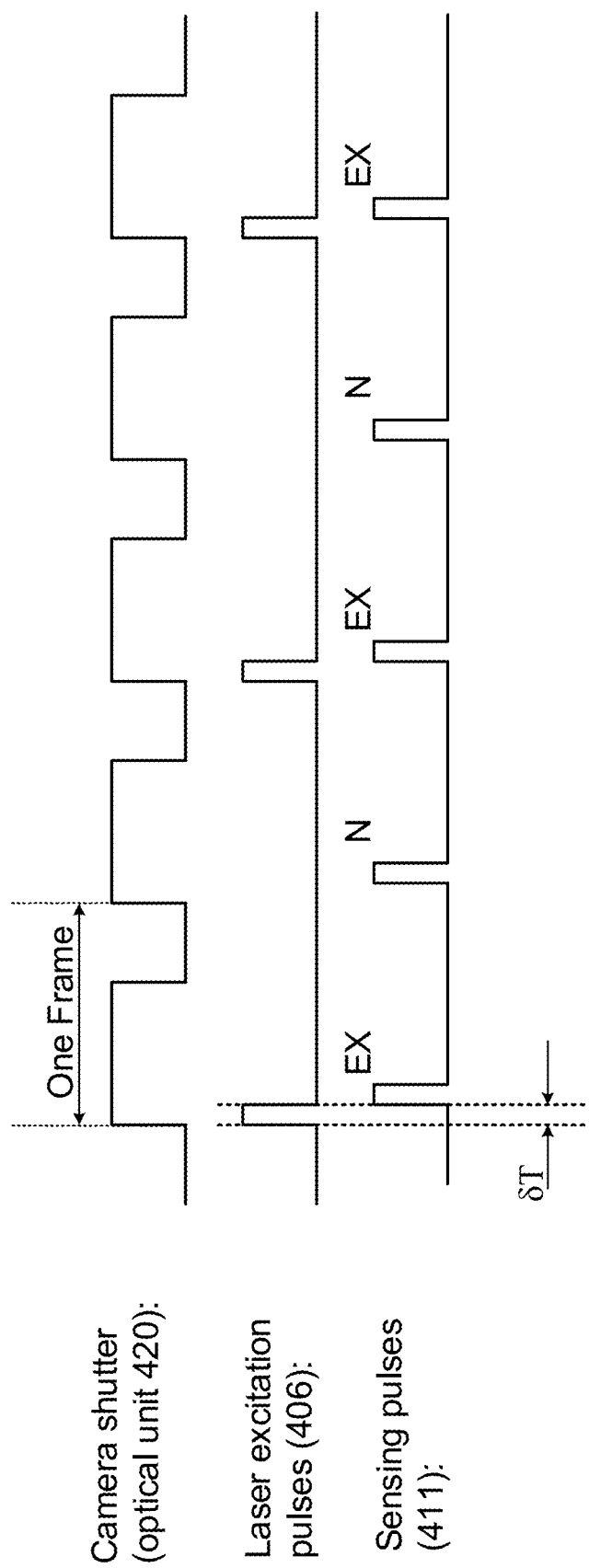

Reference is now made to FIG. 4O and FIG. 4P, which are schematic time diagrams for laser excitation beam pulses 406, sensing laser beam pulses 411 and exposures of detector 430 of an inspection unit 400 for a system for inspecting an object 90, such as system 100 and system 200, according to some embodiments of the invention.

In some embodiments, the pulse duration of excitation laser beam 406 (e.g., generated by pulsed excitation laser source laser(s) 405) and the pulse duration of sensing laser beam 411 (e.g., generated by sensing laser source 410) are determined based on, for example, a desired resolution and/or physical properties of object 90. For example, for a required resolution of ξ=1 mm, a pulse duration of excitation laser beam 406, Texcitation (e.g., generated by pulsed excitation laser source 405), should be greater than ξ/Vsound (e.g., Vsound being the speed of sound in tested object 90), e.g., Tpulse<2·10-6 sec for Vsound=2000 m/sec; and a pulse duration of sensing laser beam 406 (from sensing laser source 410), and as a result detector's 430 exposure duration must be shorter by at least half the excitation pulse duration, Tdetector=Tsensing<0.5·Texcitation=1·10-6 sec. However, detector's 430 exposure duration (e.g., a camera shutter exposure duration) may be substantially larger that required Tsensing. In some embodiments, a delay 411c between excitation laser beam pulse 406 and sensing laser beam pulse 411 may be set to vary during object's 90 inspection procedure. For example, a delay 411c may be increased between two sequential excitation/sensing cycles (e.g., as shown in FIG. 4O). Increasing delay 411c may enable acquiring speckle pattern images at different time points during detector's 430 exposure time Tdetector thereby increasing an effective sampling frequency of detector 430. For example, a camera having a sensing rate of 1 kHz may be configured to capture at an effective rate of 2 MHz.

In some embodiments, delay 411c between the sensing laser beam and excitation laser beam pulses 411, 406 respectively, may be determined based on the specific depth of at least one zone 80 below the surface of object 90 (e.g., that may be determined during the scanning of object 90 at the first predetermined resolution, as described above with respect to FIG. 1A and FIG. 2). Upon excitation of object 90 by excitation laser beam 406, the photo-acoustic excitation (e.g., photo-acoustic excitation 407, as described above with respect to FIG. 4A) starts propagating in object 90 and further generates echo signals scattered off zone(s) 80 (e.g., modified photo-acoustic excitation 407a, as described above with respect to FIG. 4A) to the excitation surface, distorting the surface and being measured by sensing laser beam 411. Accordingly, the time required for the acoustic pulse to propagate from the object's 90 surface to zone 80 (e.g., a defect in object 90) and back may be determined with respect to the acoustic wave velocity in the object's 90 material and the specific depth of zone 80 below the surface of object 90 (e.g., the deeper the zone 80, the longer the acoustic pulse needs to pass back and forth and the propagation time becomes longer).

FIG. 4P illustrates an alternative or complementary (with respect to FIG. 4O) timing scheme of scanning beam pulses 411 with respect to excitation beam pulses 406. For example, the frequency of sensing laser beam pulses 411 may be twice the frequency of the excitation laser beam pulses 406, to make every pair of sequential speckle patterns 414 to include one speckle pattern 414 affected by excitation beam pulse 406 (pulses 411 denoted "EX"), and one speckle pattern 414 which is not affected by excitation beam pulse 406 (pulses 411 denoted "N") by it. The interval between pulses 406 and 411, denoted "ST", may be zero, or determined as explained above (e.g., according to the sound propagation time in the object material). Speckle patterns 414 affected by excitation pulses 406 (pulses 411 denoted "EX") may be further compared (e.g., by analysis unit 460) to at least one subsequent or preceding speckle pattern 414 which are not affected by excitation pulse 406 (pulses 411 denoted "N"). In some embodiments, the comparison thereof may, for example, reduce a measurement noise.

Figure 4Q:
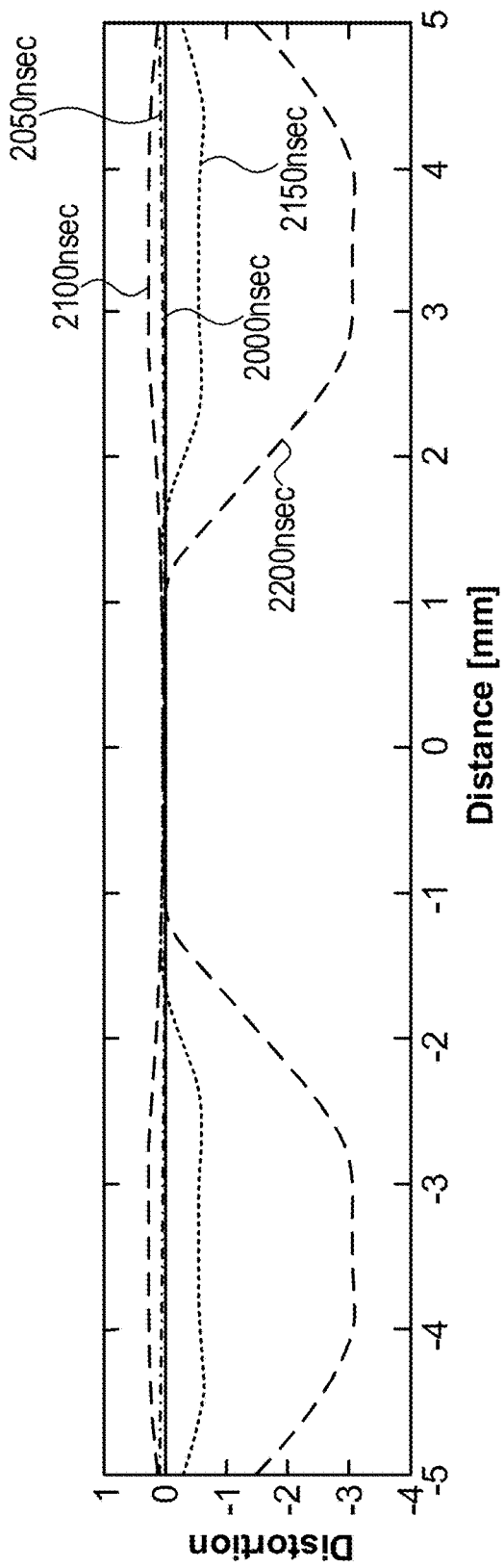
FIG. 4Q is a graph representing a simulation of part distortion upon photo-acoustic excitation by an excitation laser source of an inspection unit for a system for inspecting objects, according to some embodiments of the invention.

Reference is now made to FIG. 4Q, which is a graph representing a simulation of part distortion upon photo-acoustic excitation by an excitation laser source 405 of an inspection unit 400 for a system for inspecting objects, such as system 100 and system 200, according to some embodiments of the invention.

Part distortion is illustrated with respect to the distance from the simulated excitation point at five times after the application of the excitation pulse. The delay between scanning beam pules 411 and excitation beam pulse 406 may be determined to achieve maximal distortion and therefore high sensitivity of inspection unit 400 to the photo-acoustic excitation and defect detection.

Figure 4R:
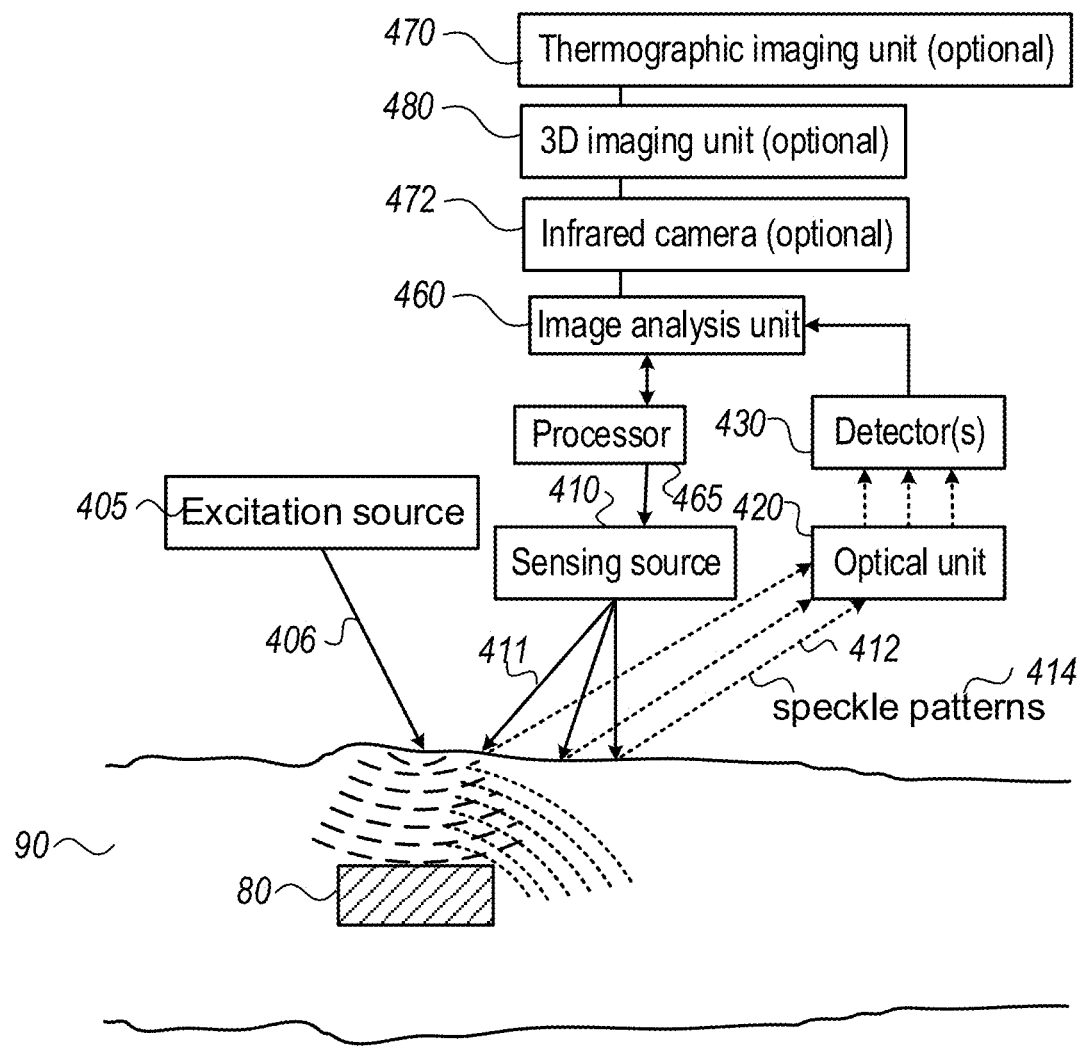
FIG. 4R is a schematic illustration of an inspection unit for a system for inspecting an object and including thermography unit, according to some embodiments of the invention.

Reference is now made to FIG. 4R, which is a schematic illustration of an inspection unit 400 for a system for inspecting an object 90, such as system 100 and system 200, and including thermography unit 470, according to some embodiments of the invention.

One or more computer processor(s) 465 may be part of inspection unit 400 and be configured to control the operation of inspection unit 400 and/or support the image processing, analysis and data fusion in system 100 or system 200. Inspection unit 400 may use the data concerning the photo-acoustic excitation 407 (or modified photo-acoustic excitation 407a) (e.g., intensity patterns) of object 90 (or predetermined region 73 on object 90) to evaluate the propagation of the ultrasonic waves in object 90 (illustrated very schematically in FIGS. 4A, 4R) and derive therefrom structural information and/or data concerning object 90.

In some embodiments, inspection unit 400 may further include a thermography unit 470 including an infrared camera 472. Thermography unit 470 may measure an amount of energy originated from excitation laser source 405 and absorbed by object 90. Energy dissipation profile in object 90 may be affected by, for example, zone 80 (e.g., a defect in object 90). Accordingly, in some embodiments, inspection unit 400 may further determine, for example, a type, size, shape and/or position, of zone 80 based on readings of infrared camera 472. Inspection unit 400 may further take the readings of thermography units 460 and/or infrared camera 472 into consideration while analyzing set (or sets) 415 of translations to, for example, avoid misinterpretation of a reduction in absorbed energy as a defect 80 in object 90. For example, the energy dissipation profile in object 90 may depend on the properties (color and material) of the excited surface. The less energy absorbed, the weaker the photo-acoustic signal is, and therefore the weaker is the signal of the translation derived from correlation between speckle patterns received. Inspection unit 400 may monitor changes in the amount of energy absorption during operation and correlate the energy absorption changes with the detected signal to avoid false detection of defects in signals which are actually due to the changes in energy absorption.

Inspection unit 400 may further include a three-dimensional (3D) imaging unit 480 to provide 3D images of object 90. Alternatively or complementarily, 3D images of object 90 may be predetermined (e.g., prior to an inspection procedure) and supplied to 3D imaging unit 480 as an input (e.g., in a 3D file format). In some embodiments, 3D imaging unit 480 may calculate dimensions of the excitation laser beam 406 spot on object 90 to, for example, determine an ultrasonic pressure generated in object 90. In some embodiments, combining of imaging data from various sources (e.g., thermography unit 470 and/or 3D imaging unit 480) may improve the accuracy and efficiency of detection of zone 80 (e.g., defect). In certain embodiments, inspection unit 400 may implement gated imaging using multiple sensing laser beams 411 to enhance sensing at high frequencies.

As noted above, inspection unit 400 may be used as at least one inspection unit 110 of system 100 and/or as second inspection unit 220 of system 200 to scan the at least one first region of multiple regions 92 that includes at least one zone 80 at the second predetermined resolution, e.g., to scan multiple predetermined regions 73 that correspond to multiple second regions 94 in the at least one first region thereof, to thereby determine the specified parameters of at least one zone 80.

Although the above description of various embodiments of inspection unit 400 (e.g., with respect to FIGS. 4A-4R) refers to scanning of object 90 at the second predetermined resolution, inspection unit 400 may be also used, according to some embodiments, as at least one inspection unit 110 of system 100 and/or as first inspection 210 unit of system 200 to scan the object 90 at the first predetermined resolution. In this case, excitation laser source 405, sensing laser source 410, optical unit 420 and/or detector 430 may be similar to excitation laser source 212, sensing laser source 214, optical units 216 and detector 218, respectively, as described above with respect to FIG. 2, and predetermined region 73 may be one of multiple first regions 92 on object 90 (e.g., as described above with respect to FIG. 1A and FIG. 2).

It is further noted that the description above of inspection unit 400 is not meant to be limiting in any way and that system 100 and system 200 may utilize any of interferometric methods and/or any of speckle pattern interferometric methods to scan the object at the first predetermined resolution and/or at the second predetermined resolution.

Reference is now made to FIG. 5, which is a flowchart of a method 5000 of inspecting an object, according to some embodiments of the invention.

Method 5000 may be implemented by system 100 or by system 200, which may be configured to implement method 5000. It is noted that method 5000 is not limited to the flowcharts illustrated in FIG. 5 and to the corresponding description. For example, in various embodiments, method 5000 needs not move through each illustrated box or stage, or in exactly the same order as illustrated and described.

Method 5000 may include scanning the object at a first predetermined resolution by alternately and repeatedly photo-acoustically exciting and sensing each of multiple first regions on the object with at least one first excitation laser beam and at least one first sensing laser beam, respectively (stage 5100).

Method 5000 may include collecting light reflected or scattered from the multiple first regions and generating, based on the collected light, multiple first outputs (stage 5200).

Method 5000 may include determining, based on at least one of the multiple first outputs, corresponding at least one first region of the multiple regions that includes at least one zone 80 and further determining a specific depth of the at least one zone 80 thereof below a surface of the object (stage 5300).

In some embodiments, method 5000 may include illuminating at least a portion of a first region of the multiple first regions that is being scanned with at least one modulated excitation laser beam having a modulated amplitude, a frequency that varies between a first predetermined frequency value and a second predetermined frequency value as function of time, and a constant predetermined wavelength (stage 5310). In some embodiments, method 5000 may include comparing a signal corresponding to the at least one modulated excitation laser beam and a first output of the multiple first outputs that corresponds to the first region that is being scanned and determining, based on the comparison thereof, a presence of the at least one zone in the first region thereof (stage 5312).

In some embodiments, method 5000 may include splitting the at least one first sensing laser beam into a first sensing beam and a first reference beam (stage 5320). In some embodiments, method 5000 may include directing the first sensing beam to illuminate a predetermined sensing location within a first region of the multiple first regions that is being scanned and directing the first reference beam to a predetermined reference location on the object that is not affected by the photo-acoustic excitation of the object in the first region thereof (stage 5322). In some embodiments, method 5000 may include generating, for a first region of the multiple first regions that is being scanned, a first sensing output and a first reference output, based on the light reflected or scattered from the predetermined sensing location and the predetermined reference location, respectively (stage 5324). In various embodiments, method 5000 may include determining, based on at least one of the first sensing output, the first reference output and/or a comparison between the first sensing output and the first reference output, a presence of the at least one zone in the first region thereof (stage 5326).

Method 5000 may include scanning the at least one first region that includes the at least one zone at a second predetermined resolution by alternately and repeatedly photo-acoustically exciting and sensing each of multiple second regions in the at least one first region thereof with at least one second excitation laser beam and at least one second sensing laser beam, respectively (stage 5400).

Method 5000 may include collecting light reflected from the multiple second regions and determining, based on the collected light, multiple second outputs (stage 5500).

Method 5000 may include determining, based on at least one of the multiple second outputs, specified parameters of the at least one zone (stage 5600).

In some embodiments, method 5000 may include determining a time delay between the at least one second sensing laser beam and the at least one second excitation laser beam based on the specific depth of the at least one zone below the surface of the object and based on acoustic parameters of the object (stage 5610).

In some embodiments, method 5000 may include generating, for a second region of the multiple second regions that is being scanned, a sequence comprising at least two temporally-sequential de-focused speckle pattern images of the second region thereof, and determining, for the second region that is being scanned, based on the sequence thereof, a set of speckle pattern images translations (stage 5620).

In some embodiments, method 5000 may include determining, for the second region that is being scanned, an angular distortion of the corresponding second region, based on the set of translations determined for the corresponding second region (stage 5622). In some embodiments, method 5000 may include determining, based on the angular distortion of the corresponding second region, an intensity pattern of the photo-acoustic excitation propagating through the second region thereof (stage 5624). In some embodiments, method 5000 may include determining, based on the intensity patterns generated for at least some of the multiple second regions, the specified parameters of the at least one zone (stage 5626).

In some embodiments, method 5000 may include illuminating multiple predetermined locations within the second region of the multiple second regions that is being scanned, with multiple narrow beams (stage 5630). In some embodiments, method 5000 may include generating corresponding multiple sequences of temporally-sequential speckle pattern images of the second region thereof, wherein each of the multiple sequences corresponds to one of the multiple predetermined locations thereof (stage 5632). In some embodiments, method 5000 may include determining, for the second region that is being scanned, multiple sets of translations, based on the corresponding multiple sequences thereof, wherein each of the multiple sets corresponds to one of the multiple predetermined locations thereof (stage 5634).

In some embodiments, method 5000 may include illuminating multiple predetermined locations within the second region that is being scanned with a single wide beam (stage 5640). In some embodiments, method 5000 may include generating a sequence of temporally-sequential speckle pattern images comprising data regarding the multiple predetermined locations, wherein each speckle pattern image in the sequence thereof comprises multiple image parts, wherein each of the multiple image parts corresponds to one of the multiple predetermined locations (stage 5642). In some embodiments, method 5000 may include determining multiple sets of translations based on the image parts thereof, wherein each of the multiple sets corresponds to one of the predetermined locations thereof (stage 5644).

In some embodiments, method 5000 may include splitting the at least one second sensing laser beam into a second sensing beam and a second reference beam (stage 5650). In some embodiments, method 5000 may include illuminating a predetermined sensing location within the second region that is being scanned and a predetermined reference location that is not affected by the photo-acoustic excitation of the object in the second region thereof, with the second sensing beam and the second reference beam respectively (stage 5652). In some embodiments, method 5000 may include gathering corresponding scattered or reflected second sensing beam and second reference beam and generating corresponding sensing and reference sequences of temporally-sequential speckle patter images (stage 5653). In some embodiments, method 5000 may include determining a sensing and a reference sets of translations based on the sensing and reference sequences, respectively (stage 5656). In some embodiments, method 5000 may include comparing the sensing set of translations and the reference set of translations, and further determining, based on the comparison thereof, a whole-body movement of the second region that is being scanned to distinguish the whole-body movement from the photo-acoustic excitation of the second region thereof (stage 5658).

In some embodiments, method 5000 may include determining a lateral shift between the second excitation laser beam and the second sensing laser beam to provide maximal amplitude of signals determined based on the corresponding sets of translations (stage 5660).

In some embodiments, method 5000 may include determining a pulse duration of the second excitation laser beam and a pulse duration of the second sensing laser beam based on at least one of: a desired spatial resolution, physical properties of the object (stage 5662).

In some embodiments, method 5000 may include increasing a delay between a pulse of the second excitation laser beam and a pulse of the second sensing laser beam to during an inspection procedure of the object to enable acquiring of speckle pattern images at different time points during an exposure time of the detector to thereby increase an effective sampling rate of the detector (stage 5664).

In some embodiments, method 5000 may include determining a frequency of the second sensing laser beam pulses based on a frequency of the excitation beam pulses, to yield second sensing laser beam pulses that are affected by corresponding excitation beam pulses and second sensing laser beam pulses that are not affected by second excitation beam pulses, and comparing speckle patterns from the affected and non-affected second sensing laser beam pulses (stage 5666).

In some embodiments, method 5000 may include operating the second excitation laser beam and the second sensing laser beam on a same side of the object or on the opposite sides of the object (stage 5668).

In some embodiments, method 5000 may include measuring an amount of energy originated from the second excitation laser beam and absorbed by the object (stage 5670).

In some embodiments, method 5000 may include determining energy dissipation profiles in the object undergoing the photo-acoustic excitation and determining, based on the energy dissipation profiles, the specified parameters of the at least one zone (stage 5672). In some embodiments, method 5000 may include providing 3D images of the object (stage 5674).

Advantageously, the disclosed systems and methods may enable a fast scanning of an object at a first predetermined resolution to determine at least one region on the object that may include at least one zone (e.g., defect, etc.) and a specified depth of the at least one zone thereof. The first resolution may be a low resolution, as, for example, compared to dimensions of the at least one zone. The systems and methods may further enable a more localized scanning of the at least one region with the at least one zone (e.g., at a second predetermined resolution that is higher as compared to the first predetermined resolution) to thereby determine specified parameters of the at least one zone (e.g., the exact shape and/or dimensions). The systems and methods may thereby enable concentrating the more localized scanning to the regions that include the at least one zone and/or determining the parameters of the more localized scanning based on, for example, the fast scanning outcomes (e.g., the specified depth of the at least one zone), thereby providing fast and robust detailed characterization of the at least one zone in the object.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the stages can occur out of the order noted in the figures. For example, two stages shown in succession can, in fact, be executed substantially concurrently, or the stages can sometimes be executed in the reverse order, depending upon the functionality involved. It will also be noted that each stage of the flowchart diagrams and/or flowchart illustration, and combinations of stages in the flowchart diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for inspecting an object, the system comprising:
   a first inspection unit comprising:
      a first excitation laser source configured to illuminate at least a portion of the object with at least one first excitation laser beam,
      a first sensing laser source configured to illuminate at least a portion of the object with at least one second sensing laser beam,
      and
      a first optical unit in association with a first detector, wherein the first optical unit is configured to collect light reflected from the object onto the first detector;
   a second inspection unit comprising:
      a second excitation laser source configured to illuminate at least a portion of the object with at least one second excitation laser beam,
      a second sensing laser source configured to illuminate at least a portion of the object with at least one second sensing laser beam, the at least one second sensing laser beam is at a lateral shift with respect to the at least one second excitation laser beam, and a second optical unit in association with a second detector, wherein the second optical unit is configured to collect light reflected from object onto the second detector; and an analysis unit in communication with the first inspection unit and the second inspection unit;

wherein the first inspection unit is configured to:

scan the object at a first predetermined spatial resolution by alternately photo-acoustically exciting and sensing each of multiple first regions on the object with at least one first excitation laser beam and with at least one first sensing laser beam, respectively, and generate, by the first detector and based on light reflected from the multiple first regions, corresponding multiple first detector outputs;

wherein the analysis unit is configured to:

determine, based on at least one of the multiple first detector outputs, at least one first region of the multiple first regions having at least one zone, determine, based on the at least one of the multiple first detector outputs, a specific depth of the at least one zone thereof below a surface of the object;

determine, based on the specific depth and acoustic parameters of the object, a time delay between the at least one second sensing laser beam and the at least one second excitation laser beam, wherein the second inspection unit is configured to:

scan the at least one first region having the at least one zone at a second predetermined spatial resolution by alternately photo-acoustically exciting and sensing each of multiple second regions in the at least one first region thereof with the at least one second excitation laser beam and with at least one sensing laser beam, respectively, according to the determined time delay, and generate, by the second detector and based on light reflected from the multiple second regions, corresponding multiple sequences each comprising at least two temporally sequential de-focused speckle pattern images of the respective region of the multiple second regions; and wherein the analysis unit is further configured to determine, based on the multiple sequences, specified parameters of the at least one zone.

2. The system of claim 1, wherein the first excitation laser source is a modulated excitation laser source configured to illuminate at least a portion of a first region of the multiple first regions of the object that is being scanned with at least one modulated excitation laser beam having a modulated amplitude that varies between a first predetermined frequency value and a second predetermined frequency value as a function of time.

3. The system of claim 2, wherein the analysis unit is configured to compare a signal corresponding to the at least one modulated excitation laser beam and a first detector output of the multiple first detector outputs that corresponds to the first region that is being scanned and to determine, based on the comparison thereof, a presence of the at least one zone in the first region thereof.

4. The system of claim 1, wherein the first inspection unit further comprises a beam splitter and a mirror, wherein the beam splitter is configured to split the at least one first sensing laser beam into a first sensing beam and a first reference beam, wherein the beam splitter is configured to further to direct the first sensing beam to illuminate a predetermined sensing location within a first region of the multiple first regions that is being scanned and wherein the mirror is configured to direct the first reference beam to a predetermined reference location on the object that is not affected by the photo-acoustic excitation of the object in the first region thereof.

5. The system of claim 4, wherein the first detector is configured to generate, for the first region that is being scanned, the first detector sensing output and the first detector reference output, based on the light reflected from the predetermined sensing location and the predetermined reference location, respectively, and wherein the analysis unit is configured to determine, based on at least one of the first detector sensing output, the first detector reference output and a comparison between the first detector sensing output and the first detector reference sensing output, a presence of the at least one zone in the first region thereof.

6. The system of claim 1, wherein the analysis unit is configured further to determine, for the second region that is being scanned, an angular distortion of the second region thereof, based on the set of translations determined for the second region thereof, and further to determine, based on the angular distortion of the second region thereof, an intensity pattern of the photo-acoustic excitation propagating through the second region thereof.

7. The system of claim 6, wherein:

the second sensing laser source is configured to illuminate multiple predetermined locations within the second region that is being scanned, with multiple narrow beams, and wherein the second optical unit further comprises a mask at a focusing plane of the second optical unit that is configured to collect corresponding multiple reflected beams to corresponding multiple predetermined regions on the second detector to yield corresponding multiple sequences of temporally-sequential speckle pattern images of the second region thereof; and wherein the analysis unit is further configured to determine, for the second region that is being scanned, multiple sets of translations, based on the corresponding multiple sequences thereof, wherein each of the multiple sets corresponds to one of the multiple predetermined locations thereof.

8. The system of claim 6, wherein:

the second sensing laser source is configured to illuminate multiple predetermined locations within the second region that is being scanned with a single wide beam, and wherein the second optical unit further comprises an aperture configured to collect a scattered beam to the second detector to yield a sequence of temporally-sequential speckle pattern images comprising data regarding the multiple predetermined locations, and wherein each speckle pattern image in the sequence thereof comprises multiple image parts, wherein each of the multiple image parts corresponds to one of the multiple predetermined locations, and wherein the analysis unit is further configured to determine multiple sets of translations based on the image parts thereof, wherein each of the multiple sets corresponds to one of the predetermined locations thereof.

9. The system of claim 6, wherein:

the at least one second sensing laser beam is split into a second sensing beam and a second reference beam configured to illuminate a predetermined sensing location within the second region that is being scanned and a predetermined reference location that is not affected by the photo-acoustic excitation of the object within the second region thereof, respectively, and wherein the optical unit is configured to collect corresponding scattered or reflected second sensing beam and second reference beam to predetermined regions on the detector to yield corresponding sensing and reference sequences of temporally-sequential speckle pattern images;

wherein the analysis unit is further configured to determine a sensing and a reference sets of translations based on the sensing and reference sequences, respectively; and wherein the analysis unit is further configured to compare the sensing set of translations and the reference set of translations, and further to determine, based on the comparison thereof, a whole-body movement of the second region that is being scanned and to distinguish the whole-body movement from the photo-acoustic excitation of the second region thereof.

10. The system of claim 9, wherein the whole-body movement comprises at least one of: translational movements; rotational movements; vibrations.

11. The system of claim 1, wherein the lateral shift is set according to a derived dependency to provide maximal amplitude of signals determined based on the corresponding sets of translations.

12. The system of claim 1, wherein a pulse duration of a second excitation laser beam generated by the second excitation laser source and a pulse duration of a second sensing laser beam generated by the second sensing laser source are determined based on at least one of: a desired spatial resolution, physical properties of the object.

13. The system of claim 1, wherein the time delay between a pulse of the second excitation laser beam and a pulse of the second sensing laser beam is configured to increase during an inspection procedure of the object to enable acquiring of speckle pattern images at different time points during an exposure time of the detector to thereby increase an effective sampling rate of the detector.

14. The system of claim 1, wherein a frequency of second sensing laser beam pulses generated by the second sensing laser source is determined based on a frequency of the second excitation beam pulses from the second excitation laser source, to yield second sensing laser beam pulses that are affected by corresponding second excitation beam pulses and second sensing laser beam pulses that are not affected by second excitation beam pulses, and wherein the analysis unit is further configured to compare speckle patterns from the affected and non-affected second sensing laser beam pulses.

15. The system of claim 1, wherein the second excitation laser beam from the second excitation laser source and a second sensing laser beam from the second sensing laser source are configured to operate on a same side of the object or on opposite sides of the object.

16. The system of claim 1, wherein the second inspection unit further comprises a thermography unit configured to measure an amount of energy originated from the second excitation laser beam of the second excitation laser source and absorbed by the object.

17. The system of claim 16, wherein the thermography unit comprises an infrared camera configured to determine energy dissipation profiles in the object undergoing the photo-acoustic excitation and the thermography unit is further configured to determine, based on the energy dissipation profiles, the specified parameters of the at least one zone.

18. The system of claim 1, wherein the second inspection unit further comprises a three-dimensional (3D) imaging unit configured to provide 3D images of the object.

19. A method of inspecting an object, the method comprising:
scanning the object at a first predetermined spatial resolution by alternately photo-acoustically exciting and sensing each of multiple first regions on the object with at least one first excitation laser beam and at least one first sensing laser beam, respectively;
collecting light generated by the at least one first sensing laser beam and reflected from the multiple first regions;
generating, based on the collected light reflected from the multiple first regions, multiple first outputs;
determining, based on at least one of the multiple first outputs, at least one first region of the multiple regions that includes at least one zone;
determining, based on the at least one of the multiple first outputs, a specific depth of the at least one zone thereof below a surface of the object;
determining, based on the specific depth and acoustic parameters of the object, a time delay between the at least one second sensing laser beam and the at least one second excitation laser beam;
scanning the at least one first region that includes the at least one zone at a second predetermined spatial resolution by alternately photo-acoustically exciting and sensing each of multiple second regions in the at least one first region thereof with at least one second excitation laser beam and at least one second sensing laser beam, respectively, according to the determined time delay, the at least one second sensing laser beam is at a lateral shift with respect to the at least one second excitation laser beam;
collecting light generated by the at least one second sensing laser beam and reflected from the multiple second regions;
generating, based on the collected light reflected from the multiple second regions, corresponding multiple sequences each comprising at least two temporally-sequential de-focused speckle pattern images of the respective region of the multiple second regions; and
determining, based on at least one of the multiple sequences, specified parameters of the at least one zone.

20. The method of claim 19, further comprising setting the lateral shift to zero to provide negligible signals except when illuminating regions right over edges of at least one zone to thereby detect the edges of the at least one zone.

* * * * *

UNITED STATES PATENT AND TRADEMARK OFFICE
CERTIFICATE OF CORRECTION

| | | |
|---|---|---|
| PATENT NO. | : 11,187,648 B2 | Page 1 of 1 |
| APPLICATION NO. | : 17/137393 | |
| DATED | : November 30, 2021 | |
| INVENTOR(S) | : Ilya Leizerson et al. | |

It is certified that error appears in the above-identified patent and that said Letters Patent is hereby corrected as shown below:

On the Title Page

Column 1, Insert Item (30):
--Foreign Priority Application Data
Aug. 7, 2018 (IL) ........................................261039--.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*